United States Patent
Sun et al.

(10) Patent No.: US 12,219,381 B2
(45) Date of Patent: Feb. 4, 2025

(54) QUALITY OF SERVICE INFORMATION NOTIFICATION METHOD, DEVICE, AND SYSTEM

(71) Applicant: HUAWEI TECHNOLOGIES CO., LTD., Guangdong (CN)

(72) Inventors: Haiyang Sun, Beijing (CN); Yongcui Li, Beijing (CN); Fangyuan Zhu, Beijing (CN); Yan Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 430 days.

(21) Appl. No.: 17/675,792

(22) Filed: Feb. 18, 2022

(65) Prior Publication Data
US 2022/0256390 A1    Aug. 11, 2022

Related U.S. Application Data

(63) Continuation of application No. PCT/CN2020/096352, filed on Jun. 16, 2020.

(30) Foreign Application Priority Data

Aug. 21, 2019    (CN) .......................... 201910775699.1

(51) Int. Cl.
*H04W 28/02*    (2009.01)
*H04L 47/2408*    (2022.01)

(52) U.S. Cl.
CPC ..... *H04W 28/0215* (2013.01); *H04L 47/2408* (2013.01)

(58) Field of Classification Search
CPC ............. H04W 28/0215; H04W 28/02; H04W 28/0236; H04W 36/0044; H04W 24/10; H04W 24/02; H04L 47/2408
See application file for complete search history.

(56) References Cited

U.S. PATENT DOCUMENTS 10,129,766 B2    11/2018 Chen et al.
11,064,457 B2 *    7/2021 Bolle .................... H04W 76/27
(Continued)

FOREIGN PATENT DOCUMENTS

| CN | 101237677 A | 8/2008 |
| CN | 101312586 A | 11/2008 |

(Continued)

OTHER PUBLICATIONS

Office Action issued in Indian Application No. 202227008759 on Jul. 14, 2022, 5 pages.

(Continued)

*Primary Examiner* — Habte Mered
(74) *Attorney, Agent, or Firm* — Fish & Richardson P.C.

(57) ABSTRACT

The present disclosure relates to quality of service (QoS) information notification methods, devices, and systems. In one example method, a user plane network element obtains a first QoS notification, where the first QoS notification includes first QoS information used to indicate QoS of a target service. The user plane network element sends first indication information to an application network element to which a QoS notification needs to be reported, where the first indication information is used to indicate a second QoS notification, the second QoS notification includes second QoS information of the target service, and the first QoS notification is the same as the second QoS notification, or the second QoS notification is determined based on the first QoS notification.

21 Claims, 12 Drawing Sheets

(56) References Cited

U.S. PATENT DOCUMENTS

| | | | |
|---|---|---|---|
| 11,968,580 B2* | 4/2024 | Han | H04W 36/302 |
| 2019/0215731 A1 | 7/2019 | Qiao et al. | |
| 2019/0253917 A1 | 8/2019 | Dao | |
| 2019/0261164 A1* | 8/2019 | Cai | H04W 8/04 |
| 2021/0076250 A1* | 3/2021 | Wang | H04W 28/0221 |
| 2022/0086697 A1* | 3/2022 | Tamura | H04W 28/24 |

FOREIGN PATENT DOCUMENTS

| | | | |
|---|---|---|---|
| CN | 103621023 A | 3/2014 | |
| CN | 108513726 A | 9/2018 | |
| CN | 110035018 A | 7/2019 | |
| CN | 110120878 A | 8/2019 | |
| EP | 3735030 A1 | 11/2020 | |
| WO | WO-2018166371 A1 * | 9/2018 | H04L 12/1407 |
| WO | 2019126931 A1 | 7/2019 | |
| WO | 2019141166 A1 | 7/2019 | |

OTHER PUBLICATIONS

3GPP TS 23.501 V16.1.0 (Jun. 2019), "3rd Generation Partnership Project; Technical Specification Group Services and System Aspects; System Architecture for the 5G System; Stage 2 (Release 16)," Jun. 2019, 367 pages.

3GPP TS 29.500 V16.0.0 (Jun. 2019), "3rd Generation Partnership Project; Technical Specification Group Core Network and Terminals; 5G System; Technical Realization of Service Based Architecture; Stage 3 (Release 16)," Jun. 2019, 36 pages.

3GPP TS 33.501 V15.5.0 (Jun. 2019), "3rd Generation Partnership Project; Technical Specification Group Services and System Aspects; Security architecture and procedures for 5G system (Release 15)," Jun. 2019, 190 pages.

Huawei, HiSilicon, "Clarification of traffic switching for GBR QoS flow in Ma Pdu session," 3GPP Tsg-Sa WG2 Meeting #134, S2-1907888, Sapporo, Japan, Jun. 24-28, 2019, 5 pages.

Huawei, HiSilicon, "Discussion on evaluation for Combinations of Uu QoS characteristics for V2X services," 3GPP Tsg Ran WG1 Meeting #96b, R1-1903961, Xi'an, China, Apr. 8-12, 2019, 5 pages.

Office Action issued in Chinese Application No. 201910775699.1 on Sep. 29, 2021, 15 pages (with English translation).

PCT International Search Report and Written Opinion issued in International Application No. PCT/CN2020/096352 on Sep. 18, 2020, 15 pages (with English translation).

Extended European Search Report issued in European Application No. 20853752.2 on Aug. 12, 2022, 9 pages.

* cited by examiner

QUALITY OF SERVICE INFORMATION NOTIFICATION METHOD, DEVICE, AND SYSTEM

CROSS-REFERENCE TO RELATED APPLICATIONS

This application is a continuation of International Patent Application No. PCT/CN2020/096352, filed on Jun. 16, 2020, which claims priority to Chinese Patent Application No. 201910775699.1, filed on Aug. 21, 2019. The disclosures of the aforementioned applications are hereby incorporated by reference in their entireties.

TECHNICAL FIELD

This application relates to the field of communication technologies, and in particular, to a quality of service (QoS) information notification method, a device, and a system.

BACKGROUND

Rapid development of mobile communication has promoted continuous emergence of various new services. The mobile communication has brought forth many new application fields such as the Internet of Vehicles or industrial control in addition to the conventional mobile internet and Internet of Things. Moreover, the mobile communication imposes higher requirements on performance such as network bandwidth and a latency, and consequently network load is further increased.

To effectively meet requirements of the development of the mobile communication for high bandwidth and a low latency, the European Telecommunications Standards Institute (ETSI) proposed a mobile edge computing (MEC) solution in 2014. MEC is a technology for deeply integrating a base station and an internet service based on a 5th generation (5G) evolution architecture. FIG. 1 shows a 5G architecture-based MEC solution. Generally, the 5G architecture-based MEC solution has two modes. In one mode, a MEC server is deployed behind a base station (as shown in a mode 1 in FIG. 1). The MEC server deployed closer to an edge may directly split local service data to a locally deployed application server. This avoids traffic detour in a core network. In the other mode, MEC server is deployed near a user plane function (UPF) network element that is closer to an edge (namely, a local UPF network element) so that a data flow passes through the UPF network element (as shown in a mode 2 in FIG. 1). Compared with a conventional deployment mode (as shown in a mode 3 in FIG. 1), the MEC solution can provide a low-latency and high-bandwidth service for a user.

In an existing QoS notification control (QNC) mechanism, when a QoS target of a QoS flow cannot be met, a session management function (SMF) network element reports a QoS notification to a policy control function (PCF) network element, and then an application network element makes a response. However, in a MEC scenario, although a user plane is deployed close to a base station, a PCF network element is centrally deployed. In this case, a path in the QNC mechanism is excessively long, and the application network element may fail to perform timely processing in response. This diverges from the original intention of the MEC solution design.

SUMMARY

Embodiments of this application provide a QoS information notification method, a device, and a system, to resolve a problem that a path in a QNC mechanism is excessively long and consequently an application network element may fail to perform timely processing in response.

To achieve the foregoing objective, the following technical solutions are used in the embodiments of this application.

According to a first aspect, a quality of service QoS information notification method is provided. The method includes: A user plane network element obtains a first QoS notification, where the first QoS notification includes first QoS information used to indicate QoS of a target service. The user plane network element sends first indication information to an application network element to which a QoS notification needs to be reported, where the first indication information is used to indicate a second QoS notification, the second QoS notification includes second QoS information of the target service, and the first QoS notification is the same as the second QoS notification, or the second QoS notification is determined based on the first QoS notification. Based on this solution provided in this embodiment of this application, the user plane network element may directly send, to the application network element to which a QoS notification needs to be reported, the first indication information used to indicate the second QoS notification, that is, QoS notification information does not need to pass through a centralized network element (for example, a policy control network element). Therefore, a path in a QNC mechanism can be shortened, so that the application network element can perform timely processing in response to the QoS notification information.

In a possible design, the first QoS information used to indicate the QoS of the target service includes first QoS information of the target service or first QoS information of a target QoS flow in which the target service is located.

In a possible design, the method further includes: The user plane network element receives second indication information from a session management network element, where the second indication information is used to indicate that the target service needs a user plane QoS notification. That the user plane network element sends first indication information to an application network element to which a QoS notification needs to be reported includes: The user plane network element sends, based on the second indication information, the first indication information to the application network element to which a QoS notification needs to be reported. That is, in this solution, as triggered by the session management network element, the user plane network element may send the first indication information to the application network element to which a QoS notification needs to be reported.

In a possible design, the method further includes: The user plane network element receives, from the session management network element, information about the application network element to which a QoS notification needs to be reported. Based on this solution, the user plane network element may address the corresponding application network element based on the information about the application network element, and further send the first indication information to the application network element to which a QoS notification needs to be reported.

In a possible design, the first indication information is a first identifier. That the user plane network element sends first indication information to an application network element to which a QoS notification needs to be reported includes: The user plane network element sends a first data packet of the target service to the application network element to which a QoS notification needs to be reported, where a header of the first data packet includes the first identifier. In other words, in this embodiment of this application, the user plane network element may send, through a user plane, the first indication information to the application network element to which a QoS notification needs to be reported.

In a possible design, the header of the first data packet is a segment routing version 6 SRv6 extension header, and the first identifier is a segment identifier in the SRv6 extension header.

In a possible design, the first indication information is the second QoS notification. That the user plane network element sends first indication information to an application network element to which a QoS notification needs to be reported includes: The user plane network element sends a first message to the application network element to which a QoS notification needs to be reported, where the first message includes the second QoS notification; or the user plane network element sends a second message to an intermediate network element, where the second message includes the second QoS notification and the information about the application network element to which a QoS notification needs to be reported, the intermediate network element sends, based on the information about the application network element to which a QoS notification needs to be reported, a third message to the application network element to which a QoS notification needs to be reported, and the third message includes the second QoS notification. In other words, in this embodiment of this application, the user plane network element may send, through a control plane, the first indication information to the application network element to which a QoS notification needs to be reported.

In a possible design, the second QoS information of the target service includes: the quality of service of the target service cannot meet a QoS requirement; the quality of service of the target service has met a QoS requirement; a service path of the target service is congested; or an operation indication related to the target service.

According to a second aspect, a quality of service QoS information notification method is provided. The method includes: An application network element receives first indication information from a user plane network element, where the first indication information is used to indicate a second QoS notification, and the second QoS notification includes second QoS information of a target service. The application network element learns of the second QoS information of the target service based on the first indication information. Based on this solution provided in this embodiment of this application, the user plane network element may directly send, to the application network element to which a QoS notification needs to be reported, the first indication information used to indicate the second QoS notification, that is, QoS notification information does not need to pass through a centralized network element (for example, a policy control network element). Therefore, a path in a QNC mechanism can be shortened, so that the application network element can perform timely processing in response to the QoS notification information.

In a possible design, the method further includes: The application network element sends third indication information to the policy control network element, where the third indication information is used to indicate that the application network element needs a user plane QoS notification, or the third indication information is used to indicate a capability of the application network element to support a user plane QoS notification. Based on this solution, the policy control network element may learn that the application network element needs the user plane QoS notification or learn of the capability of the application network element to support the user plane QoS notification.

In a possible design, the method further includes: The application network element sends information about the application network element to the policy control network element, where the policy control network element sends the information about the application network element to the user plane network element through a session management network element. Based on this solution, the user plane network element may address the corresponding application network element based on the information about the application network element, and further send the first indication information to the application network element to which a QoS notification needs to be reported.

In a possible design, the first indication information is a first identifier. That an application network element receives first indication information from a user plane network element includes: The application network element receives a first data packet from the user plane network element, where a header of the first data packet includes the first identifier. In other words, in this embodiment of this application, the user plane network element may send, through a user plane, the first indication information to the application network element to which a QoS notification needs to be reported.

In a possible design, the header of the first data packet is a segment routing version 6 SRv6 extension header, and the first identifier is a segment identifier in the SRv6 extension header.

In a possible design, the first indication information is the second QoS notification. That an application network element receives first indication information from a user plane network element includes: The application network element receives a first message from the user plane network element, where the first message includes the second QoS notification; or the application network element receives a third message from an intermediate network element, where the third message includes the second QoS notification, the third message is triggered after the intermediate network element receives a second message from the user plane network element, and the second message includes the second QoS notification and the information about the application network element. In other words, in this embodiment of this application, the user plane network element may send, through a control plane, the first indication information to the application network element to which a QoS notification needs to be reported.

In a possible design, the second QoS information of the target service includes: quality of service of the target service cannot meet a QoS requirement; quality of service of the target service has met a QoS requirement; a service path of the target service is congested; or an operation indication related to the target service.

According to a third aspect, a quality of service QoS information notification method is provided. The method includes: A session management network element receives fourth indication information from a policy control network element, where the fourth indication information is used to indicate that a target service needs a user plane QoS notification. The session management network element sends second indication information to a user plane network element, where the second indication information is used to indicate that the target service needs the user plane QoS notification. Based on this solution, the user plane network element may learn that the target service needs the user plane QoS notification.

In a possible design, the session management network element sends fifth indication information to an access network device, where the fifth indication information is used to indicate that a target QoS flow in which the target service is located needs a user plane QoS notification. Based on this solution, the access network device may learn that the target QoS flow in which the target service is located needs the user plane QoS notification.

According to a fourth aspect, a communication apparatus is provided to implement the foregoing methods. The communication apparatus may be the user plane network element in the first aspect or an apparatus including the user plane network element. Alternatively, the communication apparatus may be the application network element in the second aspect or an apparatus including the application network element. Alternatively, the communication apparatus may be the session management network element in the third aspect or an apparatus including the session management network element. The communication apparatus includes a corresponding module, unit, or means (means) for implementing the foregoing method. The module, unit, or means may be implemented by hardware or software, or implemented by hardware executing corresponding software. The hardware or software includes one or more modules or units corresponding to the foregoing functions.

According to a fifth aspect, a communication apparatus is provided. The communication apparatus includes a processor and a memory, where the memory is configured to store computer instructions; and when the processor executes the instructions, the communication apparatus is enabled to perform the method according to any one of the foregoing aspects. The communication apparatus may be the user plane network element in the first aspect or an apparatus including the user plane network element. Alternatively, the communication apparatus may be the application network element in the second aspect or an apparatus including the application network element. Alternatively, the communication apparatus may be the session management network element in the third aspect or an apparatus including the session management network element.

According to a sixth aspect, a communication apparatus is provided. The communication apparatus includes a processor. The processor is configured to: be coupled to a memory; and after reading instructions in the memory, perform the method according to any one of the foregoing aspects based on the instructions. The communication apparatus may be the user plane network element in the first aspect or an apparatus including the user plane network element. Alternatively, the communication apparatus may be the application network element in the second aspect or an apparatus including the application network element. Alternatively, the communication apparatus may be the session management network element in the third aspect or an apparatus including the session management network element.

According to a seventh aspect, a computer-readable storage medium is provided. The computer-readable storage medium stores instructions; and when the instructions are run on a computer, the computer is enabled to perform the method according to any one of the foregoing aspects.

According to an eighth aspect, a computer program product including instructions is provided. When the computer program product runs on a computer, the computer is enabled to perform the method according to any one of the foregoing aspects.

According to a ninth aspect, a communication apparatus (for example, the communication apparatus may be a chip or a chip system) is provided. The communication apparatus includes a processor, configured to implement functions in any one of the foregoing aspects. In a possible design, the communication apparatus further includes a memory, and the memory is configured to store necessary program instructions and data. When the communication apparatus is the chip system, the chip system may include a chip, or include a chip and another discrete component.

For technical effects brought by any design manner of the fourth aspect to the ninth aspect, refer to the technical effects brought by different design manners of the first aspect, the second aspect, or the third aspect. Details are not described herein again.

According to a tenth aspect, a communication method is provided. The communication method includes: A session management network element sends second indication information to a user plane network element, where the second indication information is used to indicate that a target service needs a user plane QoS notification. The user plane network element receives the second indication information, and sends, based on the second indication information after obtaining a first QoS notification, first indication information to an application network element to which a QoS notification needs to be reported, where the first QoS notification includes first QoS information used to indicate QoS of the target service, the first indication information is used to indicate a second QoS notification, the second QoS notification includes second QoS information of the target service, and the first QoS notification is the same as the second QoS notification, or the second QoS notification is determined based on the first QoS notification. For technical effects of the tenth aspect, refer to the first aspect or the third aspect. Details are not described herein again.

According to an eleventh aspect, a communication system is provided. The communication system includes a session management network element and a user plane network element. The session management network element is configured to send second indication information to the user plane network element, where the second indication information is used to indicate that a target service needs a user plane QoS notification. The user plane network element is configured to receive the second indication information, and send, based on the second indication information after obtaining a first QoS notification, first indication information to an application network element to which a QoS notification needs to be reported, where the first QoS notification includes first QoS information used to indicate QoS of the target service, the first indication information is used to indicate a second QoS notification, the second QoS notification includes second QoS information of the target service, and the first QoS notification is the same as the second QoS notification, or the second QoS notification is determined based on the first QoS notification.

In a possible design, the communication system further includes a policy control network element. The policy control network element is configured to send fourth indication information to the session management network element, where the fourth indication information is used to indicate that the target service needs the user plane QoS notification. The session management network element is further configured to receive the fourth indication information from the policy control network element. That the session management network element is configured to send second indication information to the user plane network element includes: The session management network element is configured to send the second indication information to the user plane network element based on the fourth indication information.

In a possible design, the communication system further includes the application network element. The application network element is configured to send third indication information to the policy control network element, where the third indication information is used to indicate that the application network element needs a user plane QoS notification, or the third indication information is used to indicate a capability of the application network element to support a user plane QoS notification. The policy control network element is further configured to receive the third indication information from the application network element. That the policy control network element is configured to send fourth indication information to the session management network element includes: The policy control network element is configured to send the fourth indication information to the session management network element based on the third indication information.

In a possible design, the first indication information is a first identifier. That the user plane network element is configured to send first indication information to an application network element to which a QoS notification needs to be reported includes: The user plane network element is configured to send a first data packet of the target service to the application network element to which a QoS notification needs to be reported, where a header of the first data packet includes the first identifier.

In a possible design, the header of the first data packet is a segment routing version 6 SRv6 extension header, and the first identifier is a segment identifier in the SRv6 extension header.

In a possible design, the first indication information is the second QoS notification. That the user plane network element is configured to send first indication information to an application network element to which a QoS notification needs to be reported includes: The user plane network element is configured to send a first message to the application network element to which a QoS notification needs to be reported, where the first message includes the second QoS notification; or the user plane network element is configured to send a second message to an intermediate network element, where the second message includes the second QoS notification and information about the application network element to which a QoS notification needs to be reported, the intermediate network element sends, based on the information about the application network element to which a QoS notification needs to be reported, a third message to the application network element to which a QoS notification needs to be reported, and the third message includes the second QoS notification.

For technical effects brought by any design manner of the eleventh aspect, refer to the technical effects brought by different design manners of the first aspect or the third aspect. Details are not described herein again.

According to a twelfth aspect, a communication system is provided. The communication system includes a user plane network element and an application network element. The user plane network element is configured to obtain a first QoS notification, where the first QoS notification includes first QoS information of a target service. The user plane network element is further configured to send first indication information to the application network element to which a QoS notification needs to be reported, where the first indication information is used to indicate a second QoS notification, the second QoS notification includes second QoS information of the target service, and the first QoS notification is the same as the second QoS notification, or the second QoS notification is determined based on the first QoS notification. The application network element is configured to receive the first indication information from the user plane network element. For technical effects of the twelfth aspect, refer to the first aspect or the second aspect. Details are not described herein again.

DESCRIPTION OF EMBODIMENTS

For ease of understanding solutions in embodiments of this application, related concepts are first briefly described as follows:

(1) Protocol data unit (PDU) session:

The PDU session is an association between a terminal device and a data network (DN), and is used to provide a PDU connection service.

(2) QoS parameter:

The QoS parameter in the embodiments of this application includes one or more of the following parameters:

1. 5G QoS identifier (QI)

The 5QI is a scalar to be indexed to a corresponding 5G QoS characteristic. The 5QI is classified into a standardized 5QI, a preconfigured 5QI, and a dynamically allocated 5QI. The standardized 5QIs are in a one-to-one correspondence with a group of standardized 5G QoS characteristic values. A 5G QoS characteristic value corresponding to the preconfigured 5QI is preconfigured on an access network device. A 5G QoS characteristic corresponding to the dynamically allocated 5QI is sent by a core network device to the access network device by using a QoS profile (QoS profile).

2. Allocation and retention priority (ARP)

The ARP includes a priority level, a preemption capability, and a preemption vulnerability.

3. Guaranteed flow bit rate (GFBR)

The GFBR represents a bit rate that is expected to be provided for a guaranteed bit rate (guaranteed bit rate, GBR) QoS flow (flow).

4. Maximum flow bit rate (MFBR)

The MFBR is used to limit a bit rate provided for a GBR QoS flow, namely, a maximum bit rate provided for the GBR QoS flow. If the bit rate is exceeded, a data packet can be discarded.

5. Reflective QoS attribute (RQA)

The RQA is used to indicate a service transmitted by using a corresponding QoS flow to use reflective QoS.

6. QNC

The QNC is used to indicate an access network device whether to notify a network side in a use period of a QoS flow when a GFBR cannot be met.

Figure 1:
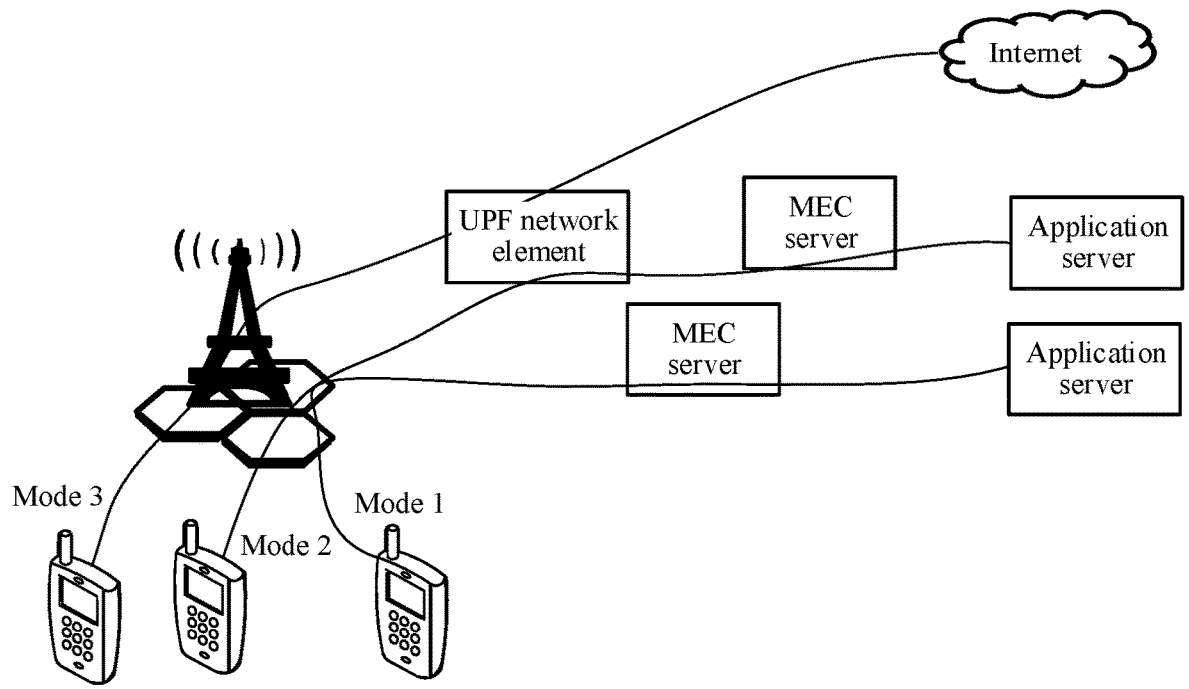
FIG. 1 is a schematic diagram of a structure in an existing 5G architecture-based MEC solution.
Figure 2:
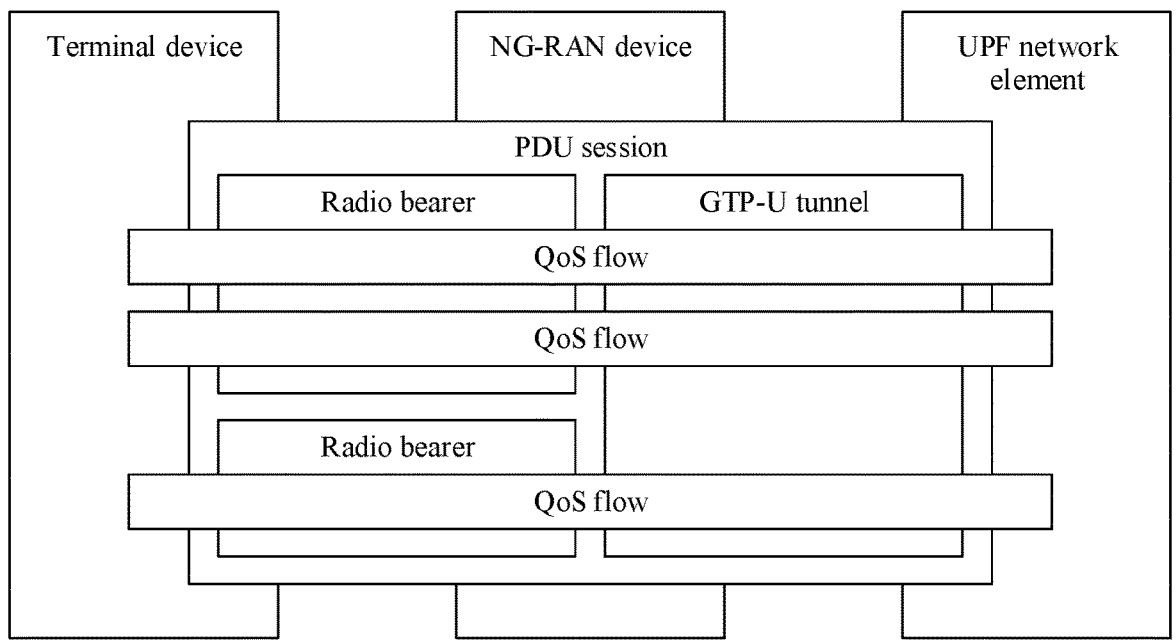
FIG. 2 shows a schematic diagram of an existing 5G QoS model.

(3) QoS model:

In a 5G system, to ensure end-to-end quality of service of a service, a QoS flow (flow)-based 5G QoS model is proposed, as shown in FIG. 2. The 5G QoS model supports a guaranteed bit rate QoS flow (namely, a GBR QoS flow) and a non-guaranteed bit rate QoS flow (namely, a non-GBR QoS flow). Same transmission processing (such as scheduling or an admission control) is performed on data packets controlled by using a same QoS flow.

As shown in FIG. 2, one terminal device may establish one or more PDU sessions with a 5G network, and one or more QoS flows may be established on each PDU session. One QoS flow is identified by one QoS flow identifier (QFI), in other words, the QFI uniquely identifies one QoS flow on a session. One PDU session is in a one-to-one correspondence with a general packet radio service (GPRS) tunneling protocol-user plane (GTP-U) tunnel between a next generation radio access network (NG-RAN) device and a UPF network element. One QoS flow corresponds to one radio bearer between the terminal device and the NG-RAN device, but one radio bearer may correspond to one or more QoS flows.

Whether a QoS flow is a GBR QoS flow or a non-GBR QoS flow is determined based on a corresponding QoS profile.

For the GBR QoS flow, a corresponding QoS profile needs to include the following QoS parameters: a 5QI, an ARP, a GFBR, and an MFBR, and optionally includes QNC. The GBR QoS flow is classified into a GBR QoS flow that requires notification control and a GRB QoS flow that does not require notification control, depending on whether the QoS profile includes the QNC. For the GBR QoS flow that requires notification control, when an access network device detects that a corresponding QoS flow resource cannot be met, the access network device notifies a session management function (SMF) network element of the event. Further, an SMF network element may initiate a QoS flow deletion or modification procedure.

For the non-GBR QoS flow, a corresponding QoS profile needs to include the following QoS parameters: a 5QI and an ARP, and optionally includes an RQA.

Figure 3:
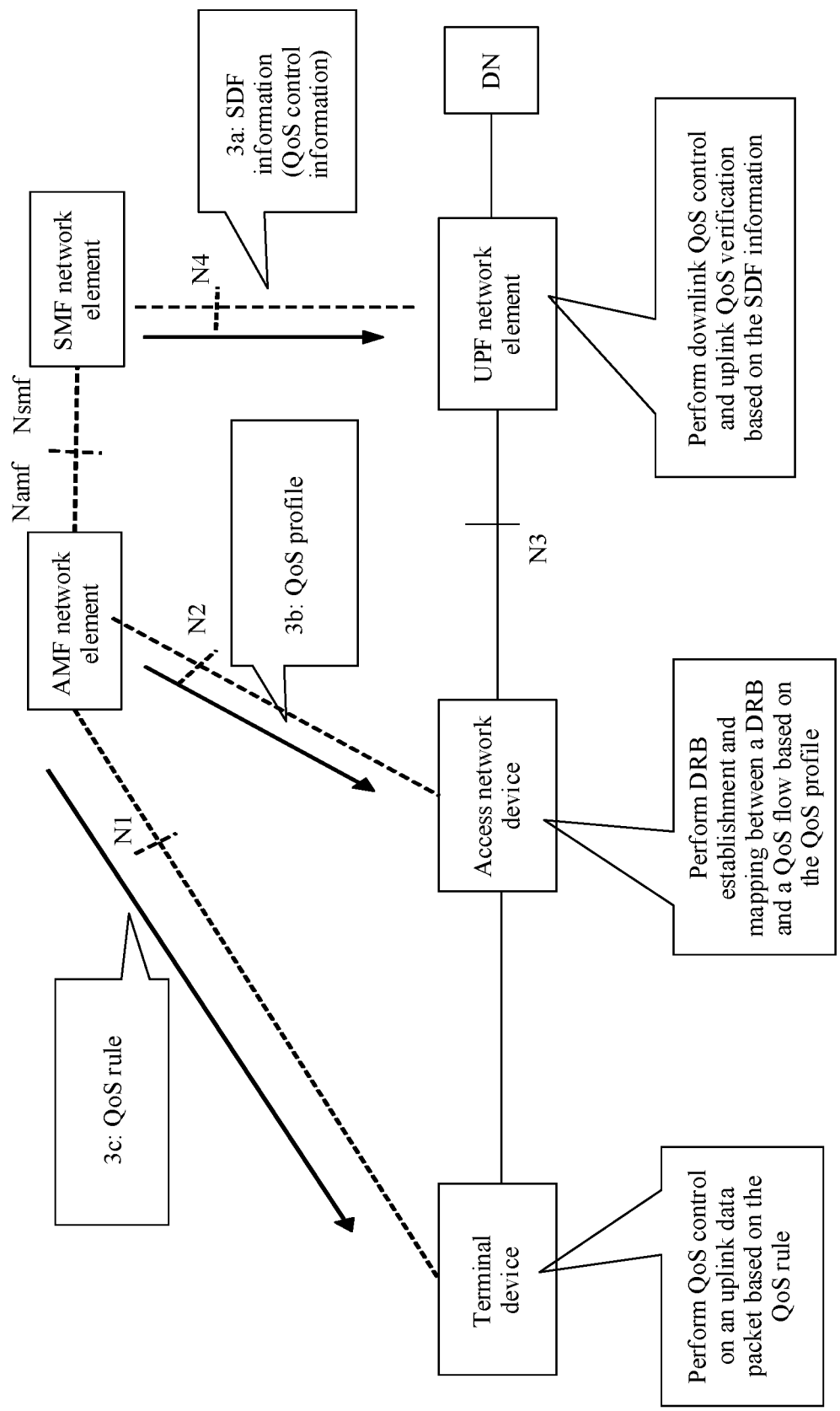
FIG. 3 is a schematic diagram of an existing architecture of signaling-based QoS flow establishment.

In addition, the GBR QoS flow is mainly controlled in a signaling-based manner. A corresponding QoS flow establishment procedure is that shown in FIG. 3, and includes the following steps.

Step 1: If the SMF network element determines, according to a local policy or a PCC rule sent by a PCF network element, to establish a QoS flow, (3*a*) the SMF network element sends service data flow (DF) information to a UPF network element, where the SDF information includes QoS control information; (3*b*) the SMF network element sends a QoS profile of the QoS flow to the access network device through an access and mobility management function (AMF) network element; and (3*c*) the SMF network element sends a QoS rule to a terminal device through the AMF network element and the access network device, where the QoS rule includes the QoS control information.

Step 2: The access network device establishes an air interface DRB based on the QoS profile, and stores a binding relationship between the QoS flow and the DRB, where a QoS flow is established between the terminal device, the access network device, and the UPF network element.

For a downlink, when receiving a downlink data packet, the UPF network element includes a QFI in a data packet header of the downlink data packet based on SDF information sent by the SMF network element. When receiving the downlink data packet, the access network device transmits the downlink data packet on a corresponding DRB based on the QFI in the data packet header and a corresponding binding relationship between a QoS flow and a DRB.

For an uplink, when determining to send an uplink data packet, the terminal device determines a QoS flow according to a QoS rule, includes a QFI in a data packet header of a to-be-sent uplink data packet, and transmits the uplink data packet on a corresponding DRB based on a binding relationship between a QoS flow and a DRB. When receiving the uplink data packet, the access network device includes the QFI in a data packet header of an uplink data packet between the access network device and the UPF network element based on the QFI in the data packet header. When receiving the uplink data packet sent by the access network device, the UPF network element verifies whether the data packet is transmitted through a correct QoS flow.

Figure 4:
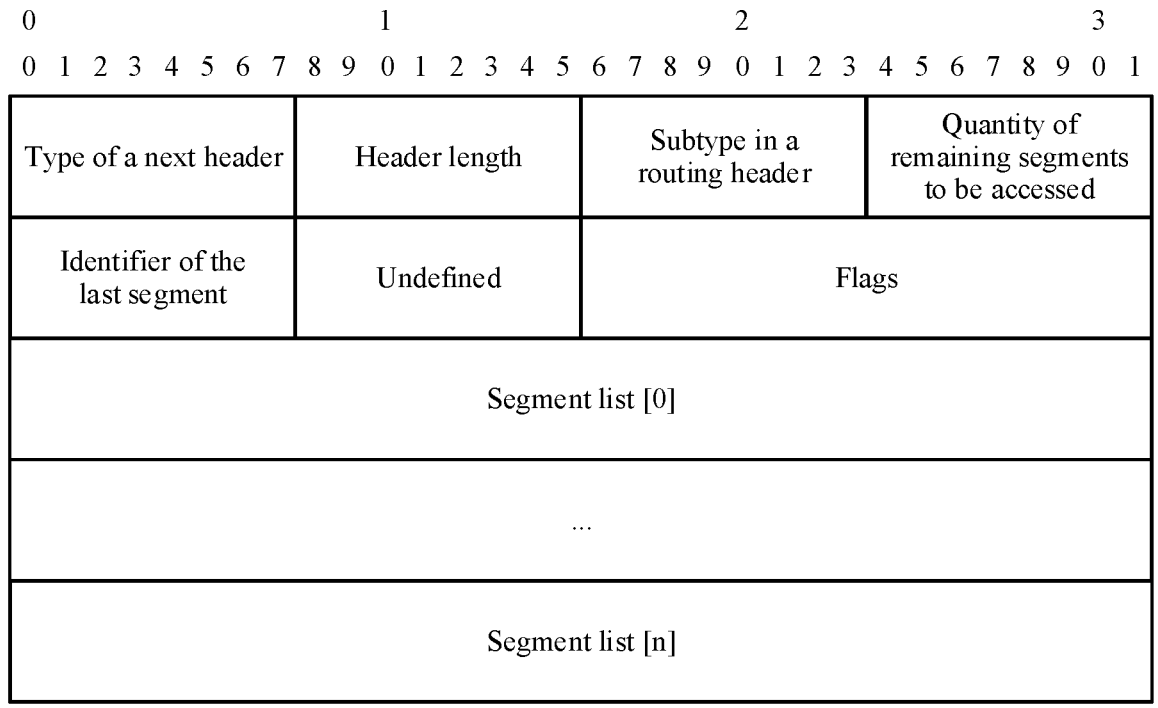
FIG. 4 is a schematic diagram of a structure of an existing SRH field.

(4) Segment routing over internet protocol version 6 (IPv6) data plane (SRv6):

SR deployed on an IPv6 data plane is referred to as SRv6. To support SRv6, an IPv6 routing header needs to be extended, where the IPv6 routing header is referred to as a segment routing header (SRH). As shown in FIG. 4, the SRH includes the following fields:

Next Header: a type of a next header;

Hdr Ext Len: a header length;

routing type: a subtype in the routing header, having a recommended value of 4;

Segment Left: a quantity of remaining segments to be accessed;

Last Entry: an identifier of the last node (starting from 0);

flags: undefined;

tag: used to identify traffic; and node list [n]: a 128-bit IPv6 address, where in reverse order, a node list [0] is the last node (identified by a segment identifier).

In the embodiments of this application, the segment identifier may be an IPv6 local interface address. However, in most cases, the segment identifier is not an IPv6 local interface address. In addition, to support SRv6 network programming, a segment identifier format may be divided into:

Locator: an address prefix, used for routing to a release node;

Function: an operation function performed on a data packet at a node, where the function has been defined as, for example, End or End.X; and Argument (optional): carrying a parameter, for example, a VPN ID.

The following describes the technical solutions in the embodiments of this application with reference to the accompanying drawings in the embodiments of this application. In the description of this application, "/" indicates that associated objects are in an "or" relationship unless otherwise specified. For example, A/B may represent A or B. In this application, "and/or" describes only an association relationship between associated objects and represents that three relationships may exist. For example, A and/or B may represent the following three cases: Only A exists, both A and B exist, and only B exists, where A and B may be singular or plural. In addition, in the description of this application, "a plurality of" means two or more than two unless otherwise specified. The term "at least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, to clearly describe the technical solutions in the embodiments of this application, terms such as "first" and "second" are used in the embodiments of this application to distinguish between same items or similar items that provide basically same functions or purposes. A person skilled in the art may understand that the terms such as "first" and "second" do not limit a quantity and an execution sequence, and the terms such as "first" and "second" do not indicate a definite difference. In addition, in the embodiments of this application, a word such as "example" or "for example" is used to represent giving an example, an illustration, or description. Any embodiment or design scheme described as an "example" or "for example" in the embodiments of this application shall not be explained as being more preferred or having more advantages than another embodiment or design scheme. Exactly, use of the word "example", "for example", or the like is intended to present a related concept in a specific manner for ease of understanding.

In addition, network architectures and service scenarios described in the embodiments of this application are intended to describe the technical solutions in the embodiments of this application more clearly, and do not constitute a limitation on the technical solutions provided in the embodiments of this application. A person of ordinary skill in the art may learn that with evolution of the network architectures and emergence of new service scenarios, the technical solutions provided in the embodiments of this application are also applicable to similar technical problems.

Figure 5:
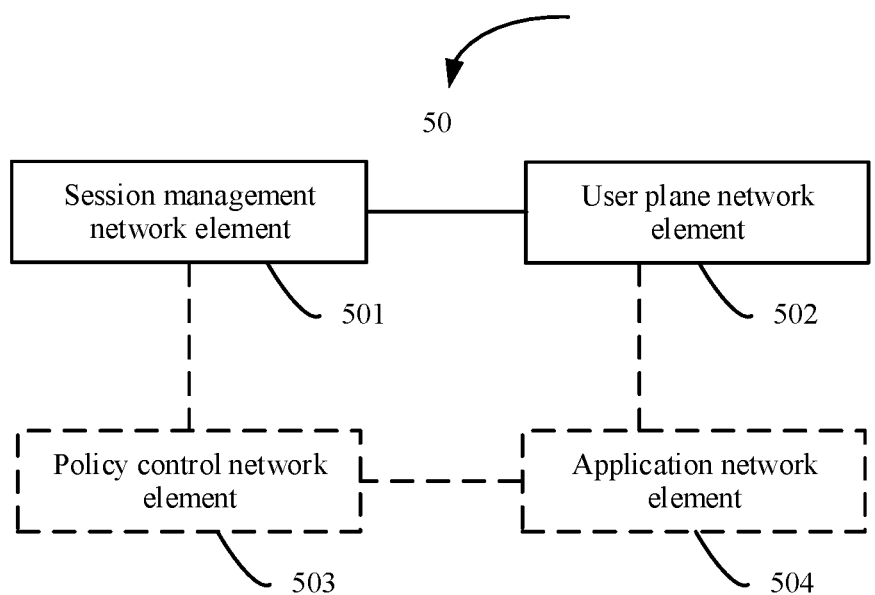
FIG. 5 is a schematic diagram of a structure of a communication system according to an embodiment of this application.

FIG. 5 shows a communication system 50 according to an embodiment of this application. The communication system 50 includes a session management network element 501 and a user plane network element 502. The session management network element 501 may directly communicate with the user plane network element 502, or may communicate with the user plane network element 502 through forwarding by another device. This is not specifically limited in this embodiment of this application.

The session management network element 501 is configured to send second indication information to the user plane network element 502, where the second indication information is used to indicate that a target service needs a user plane QoS notification. The user plane network element 502 is configured to receive the second indication information, and send, based on the second indication information after obtaining a first QoS notification, first indication information to an application network element to which a QoS notification needs to be reported, where the first QoS notification includes first QoS information used to indicate QoS of the target service, the first indication information is used to indicate a second QoS notification, the second QoS notification includes second QoS information of the target service, and the first QoS notification is the same as the second QoS notification, or the second QoS notification is determined based on the first QoS notification. A specific implementation of the foregoing solution is described in detail in subsequent method embodiments. Details are not described herein.

Based on the communication system provided in this embodiment of this application, the user plane network element may directly send, to the application network element to which a QoS notification needs to be reported, the first indication information used to indicate the second QoS notification, that is, QoS notification information does not need to pass through a centralized network element (for example, a policy control network element). Therefore, a path in a QNC mechanism can be shortened, so that the application network element can perform timely processing in response to the QoS notification information.

Optionally, as shown in FIG. 5, the communication system 50 may further include a policy control network element 503. The policy control network element 503 may directly communicate with the session management network element 501, or may communicate with the session management network element 501 through forwarding by another device. This is not specifically limited in this embodiment of this application.

The policy control network element 503 is configured to send fourth indication information to the session management network element 501, where the fourth indication information is used to indicate that the target service needs the user plane QoS notification. The session management network element 501 is further configured to receive the fourth indication information from the policy control network element 503. That the session management network element 501 is configured to send second indication information to the user plane network element 502 includes: The session management network element 501 is configured to send the second indication information to the user plane network element 502 based on the fourth indication information. A specific implementation of the foregoing solution is described in detail in the subsequent method embodiments. Details are not described herein.

In other words, in this embodiment of this application, the session management network element may send the second indication information to the user plane network element based on the fourth indication information of the policy control network element.

Optionally, as shown in FIG. 5, the communication system 50 may further include the application network element 504. The application network element 504 may directly communicate with the policy control network element 503, or may communicate with the policy control network element 503 through forwarding by another device. This is not specifically limited in this embodiment of this application.

The application network element 504 is configured to send third indication information to the policy control network element 503, where the third indication information is used to indicate that the target service needs the user plane QoS notification, or the third indication information is used to indicate a capability of the application network element 504 to support the user plane QoS notification. The policy control network element 503 is further configured to receive the third indication information from the application network element 504. That the policy control network element 503 is configured to send fourth indication information to the session management network element 501 includes: The policy control network element 503 is configured to send the fourth indication information to the session management network element 501 based on the third indication information.

In other words, in this embodiment of this application, the policy control network element may send the fourth indication information to the session management network element based on the third indication information delivered by the application network element.

Figure 6:
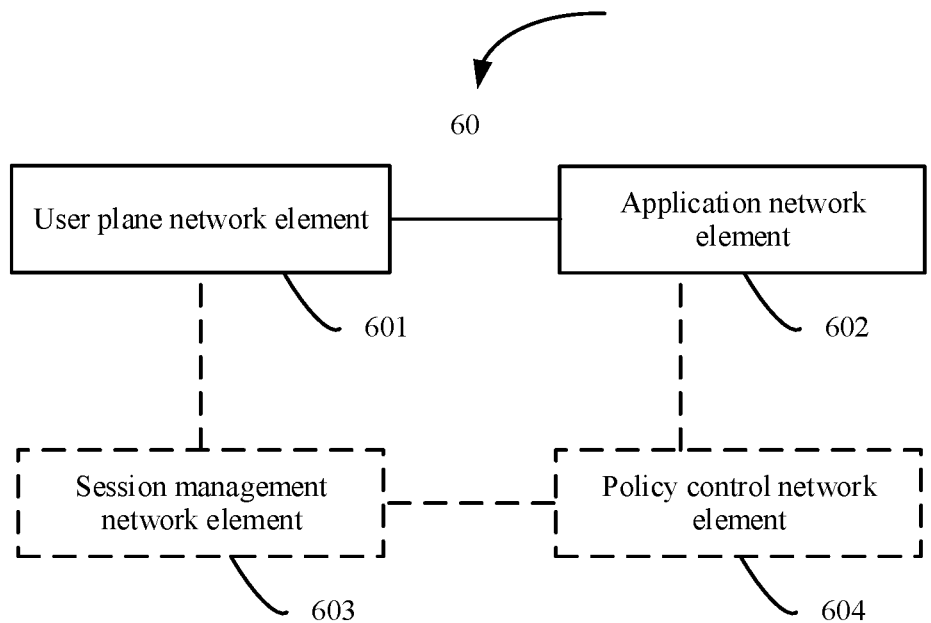
FIG. 6 is a schematic diagram of a structure of another communication system according to an embodiment of this application.

FIG. 6 shows another communication system 60 according to an embodiment of this application. The communication system 60 includes a user plane network element 601 and an application network element 602. The user plane network element 601 may directly communicate with the application network element 602, or may communicate with the application network element 602 through forwarding by another device. This is not specifically limited in this embodiment of this application.

The user plane network element 601 is configured to obtain a first QoS notification, where the first QoS notification includes first QoS information used to indicate QoS of a target service. The user plane network element 601 is further configured to send first indication information to the application network element 602 to which a QoS notification needs to be reported, where the first indication information is used to indicate a second QoS notification, the second QoS notification includes second QoS information of the target service, and the first QoS notification is the same as the second QoS notification, or the second QoS notification is determined based on the first QoS notification. The application network element 602 is configured to receive the first indication information from the user plane network element 601. A specific implementation of the foregoing solution is described in detail in subsequent method embodiments. Details are not described herein.

Based on the communication system provided in this embodiment of this application, the user plane network element may directly send, to the application network element to which a QoS notification needs to be reported, the first indication information used to indicate the second QoS notification, that is, QoS notification information does not need to pass through a centralized network element (for example, a policy control network element). Therefore, a path in a QNC mechanism can be shortened, so that the application network element can perform timely processing in response to the QoS notification information.

Optionally, as shown in FIG. 6, the communication system 60 may further include a session management network element 603. The session management network element 603 may directly communicate with the user plane network element 601, or may communicate with the user plane network element 601 through forwarding by another device. This is not specifically limited in this embodiment of this application.

The session management network element 603 is configured to send second indication information to the user plane network element 601, where the second indication information is used to indicate that the target service needs a user plane QoS notification. That the user plane network element 601 is further configured to send first indication information to the application network element 602 to which a QoS notification needs to be reported includes: The user plane network element 601 is configured to receive second indication information, and send, based on the second indication information, the first indication information to the application network element to which a QoS notification needs to be reported. A specific implementation of the foregoing solution is described in detail in the subsequent method embodiments. Details are not described herein.

In other words, in this embodiment of this application, the user plane network element may send the first indication information to the application network element based on the second indication information sent by the session management network element.

Optionally, as shown in FIG. 6, the communication system 60 may further include a policy control network element 604. The policy control network element 604 may directly communicate with the session management network element 603, or may communicate with the session management network element 603 through forwarding by another device. This is not specifically limited in this embodiment of this application.

The policy control network element 604 is configured to send fourth indication information to the session management network element 603, where the fourth indication information is used to indicate that the target service needs the user plane QoS notification. The session management network element 603 is further configured to receive the fourth indication information from the policy control network element 604. That the session management network element 603 is configured to send second indication information to the user plane network element 601 includes: The session management network element 603 is configured to send the second indication information to the user plane network element 601 based on the fourth indication information. A specific implementation of the foregoing solution is described in detail in subsequent method embodiments. Details are not described herein.

In other words, in this embodiment of this application, the session management network element may send the second indication information to the user plane network element based on the fourth indication information sent by the policy control network element.

Optionally, the application network element 602 is further configured to send third indication information to the policy control network element 604, where the third indication information is used to indicate that the target service needs the user plane QoS notification, or the third indication information is used to indicate a capability of the application network element 602 to support a user plane QoS notification. The policy control network element 604 is further configured to receive the third indication information from the application network element 602. That the policy control network element 604 is configured to send fourth indication information to the session management network element

603 includes: The policy control network element 604 is configured to send the fourth indication information to the session management network element 603 based on the third indication information.

In other words, in this embodiment of this application, the policy control network element may send the fourth indication information to the session management network element based on the third indication information delivered by the application network element.

Optionally, the first QoS notification in this embodiment of this application may include, for example, first QoS information of the target service or first QoS information of a target QoS flow in which the target service is located. Unified description is provided herein, and details are not described below again.

Optionally, the communication system 50 shown in FIG. 5 or the communication system 60 shown in FIG. 6 may be used in a currently discussed 5G network, another future network, or the like. This is not specifically limited in the embodiments of this application.

Figure 7A:
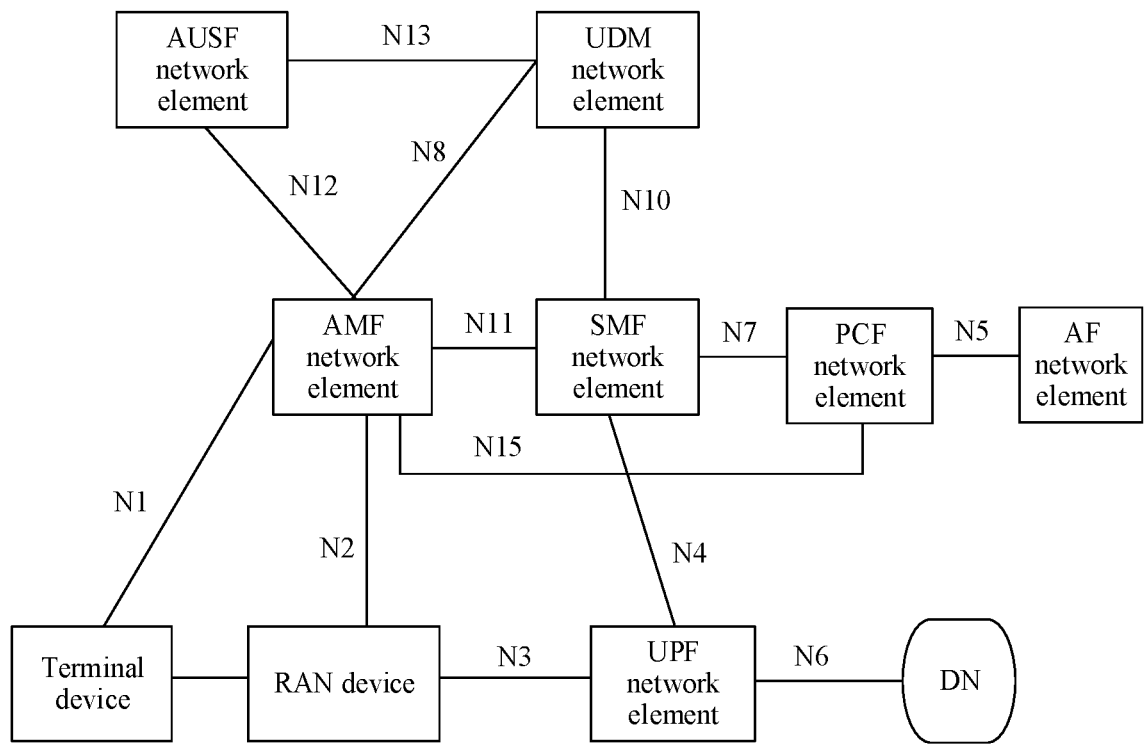
FIG. 7a shows a 5G network architecture 1 in a non-roaming scenario according to an embodiment of this application.

For example, assuming that the communication system 50 shown in FIG. 5 or the communication system 60 shown in FIG. 6 is used in a 5G network architecture in a non-roaming scenario, as shown in FIG. 7a, a network element or an entity corresponding to the session management network element may be an SMF network element in the non-roaming 5G network architecture, a network element or an entity corresponding to the policy control network element may be a PCF network element in the non-roaming 5G network architecture, a network element or an entity corresponding to the user plane network element may be a UPF network element in the non-roaming 5G network architecture, and a network element or an entity corresponding to the application network element may be an application function (AF) network element in the non-roaming 5G network architecture.

In addition, as shown in FIG. 7a, the non-roaming 5G network architecture may further include a RAN device, an AMF network element, a unified data management (UDM) network element, an authentication server function (AUSF) network element, or the like. This is not specifically limited in this embodiment of this application.

A terminal device communicates with the AMF network element through a next generation (N) 1 interface (N1 for short). The RAN device communicates with the AMF network element through an N2 interface (N2 for short), and the RAN device communicates with the UPF network element through an N3 interface (N3 for short). The UPF network element communicates with a DN through an N6 interface (N6 for short). The AMF network element communicates with the SMF network element through an N11 interface (N11 for short), the AMF network element communicates with the UDM network element through an N8 interface (N8 for short), the AMF network element communicates with the AUSF network element through an N12 interface (N12 for short), and the AMF network element communicates with the PCF network element through an N15 interface (N15 for short). The SMF network element communicates with the PCF network element through an N7 interface (N7 for short), the SMF network element communicates with the UPF network element through an N4 interface (N4 for short), and the SMF network element communicates with the UDM network element through an N10 interface (N10 for short). The UDM network element communicates with the AUSF network element through an N13 interface (N13 for short). The PCF network element communicates with the AF network element through an N5 interface (N5 for short).

Figure 7B:
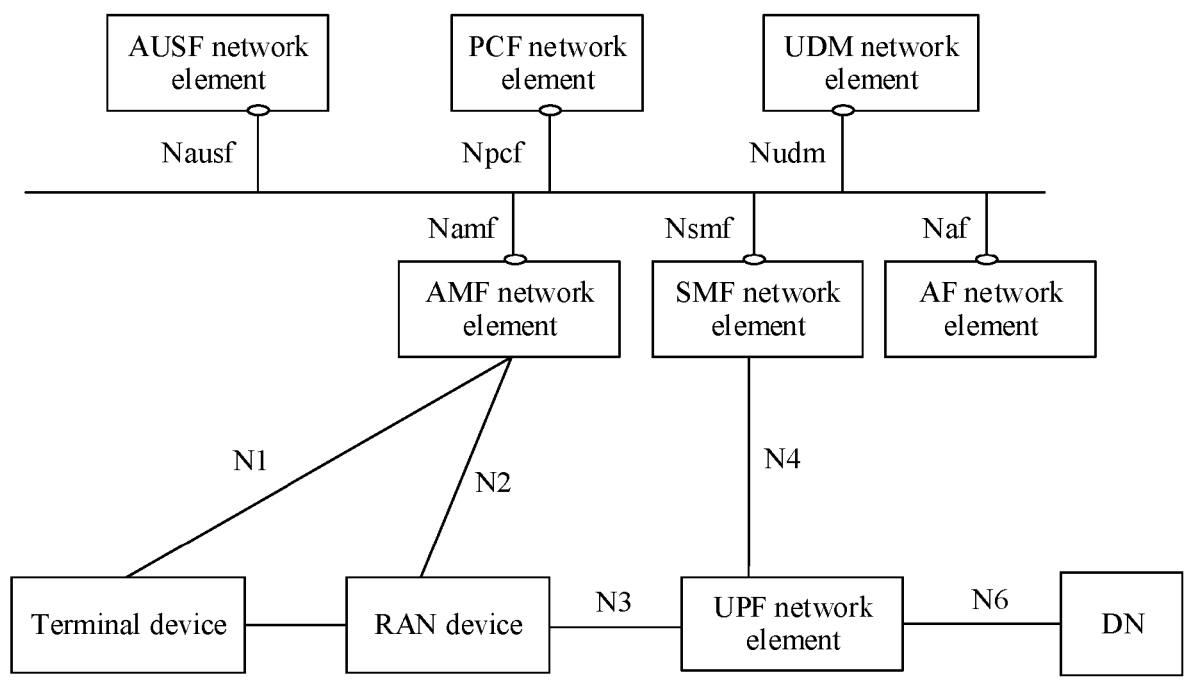
FIG. 7b shows a schematic diagram of a 5G network architecture 2 in a non-roaming scenario according to an embodiment of this application.

In addition, it should be noted that control plane network elements such as the AMF network element, the SMF network element, the UDM network element, the AUSF network element, the PCF network element, and the AF network element in the non-roaming 5G network architecture shown in FIG. 7a may alternatively interact with each other through service-oriented interfaces. For example, as shown in FIG. 7b, an external service-oriented interface provided by the AMF network element may be Namf, an external service-oriented interface provided by the SMF network element may be Nsmf, an external service-oriented interface provided by the UDM network element may be Nudm, an external service-oriented interface provided by the PCF network element may be Npcf, an external service-oriented interface provided by the AUSF network element may be Nausf, and an external service-oriented interface provided by the AF network element may be Naf. For related description, refer to a 5G system architecture in the standard 23501. Details are not described herein.

Figure 8A:
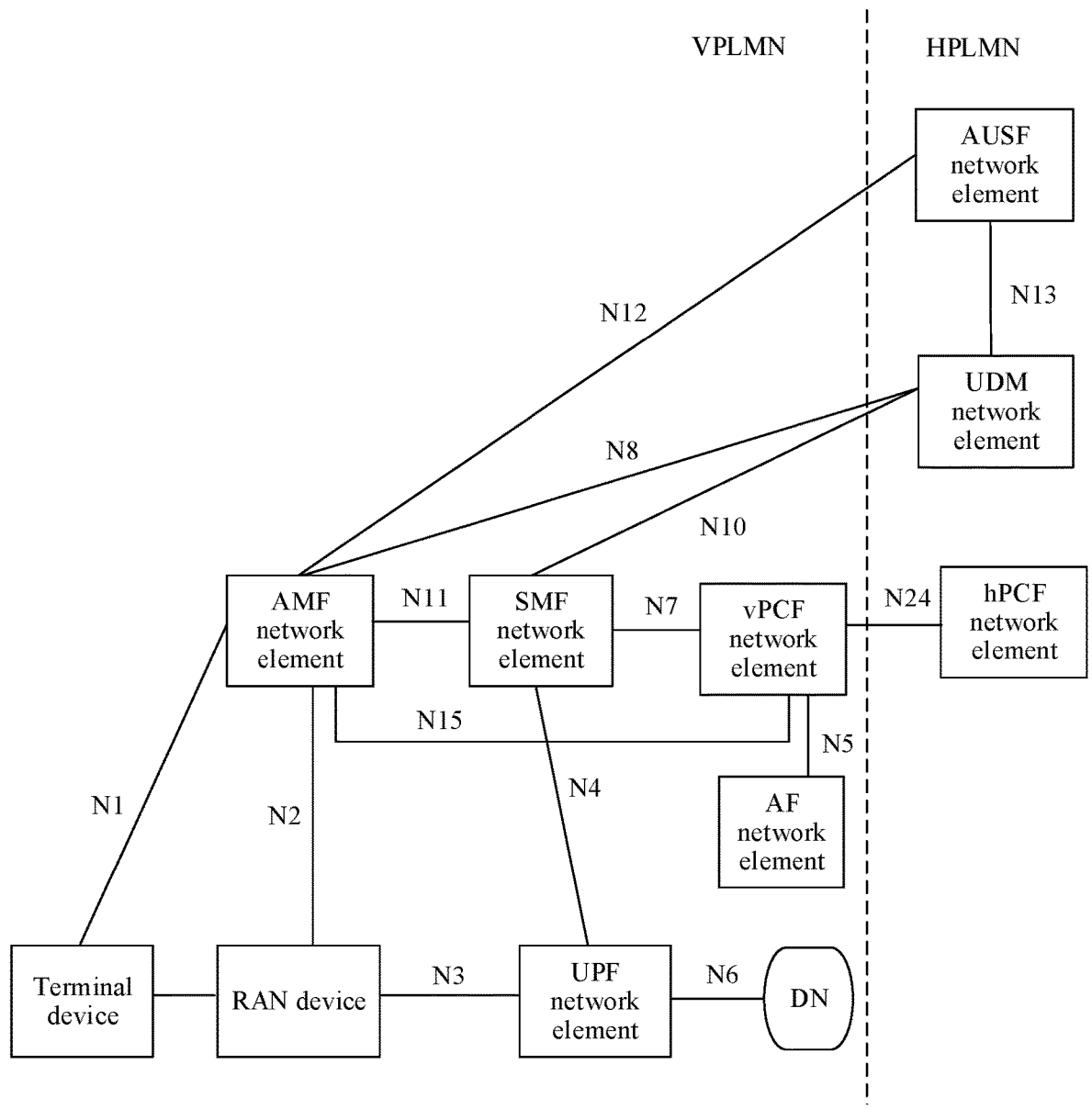
FIG. 8a shows a schematic diagram of a 5G network architecture 1 in a local breakout roaming scenario according to an embodiment of this application.

Alternatively, for example, assuming that the communication system 50 shown in FIG. 5 or the communication system 60 shown in FIG. 6 is used in a 5G network architecture in a local breakout roaming scenario, as shown in FIG. 8a, a network element or an entity corresponding to the session management network element may be an SMF network element in the local breakout roaming 5G network architecture, a network element or an entity corresponding to the policy control network element may be a visited PCF (vPCF) network element in the local breakout roaming 5G network architecture, a network element or an entity corresponding to the user plane network element may be a UPF network element in the local breakout roaming 5G network architecture, and a network element or an entity corresponding to the application network element may be an AF network element in the local breakout roaming 5G network architecture.

In addition, as shown in FIG. 8a, the local breakout roaming 5G network architecture may further include a RAN device, an AMF network element, a UDM network element, a home PCF (hPCF) network element, an AUSF network element, or the like. This is not specifically limited in this embodiment of this application. The UDM network element, the AUSF network element, and the hPCF network element belong to a home public land mobile network (HPLMN). The RAN device, the AMF network element, the SMF network element, the UPF network element, the AF network element, or the vPCF network element belongs to a visited public land mobile network (visited public land mobile network, VPLMN).

A terminal device communicates with the AMF network element through an N1 interface (N1 for short). The RAN device communicates with the AMF network element through an N2 interface (N2 for short), and the RAN device communicates with the UPF network element through an N3 interface (N3 for short). The UPF network element communicates with a DN through an N6 interface (N6 for short). The AMF network element communicates with the SMF network element through an N11 interface (N11 for short), the AMF network element communicates with the UDM network element through an N8 interface (N8 for short), the AMF network element communicates with the AUSF network element through an N12 interface (N12 for short), and the AMF network element communicates with the vPCF network element through an N15 interface (N15 for short). The SMF network element communicates with the vPCF network element through an N7 interface (N7 for short). The vPCF network element communicates with the hPCF network element through an N24 interface (N24 for short), and the vPCF network element communicates with the AF network element through an N5 interface (N5 for short). The SMF network element communicates with the UPF network element through an N4 interface (N4 for short), and the SMF network element communicates with the UDM network element through an N10 interface (N10 for short). The UDM network element communicates with the AUSF network element through an N13 interface (N13 for short).

Figure 8B:
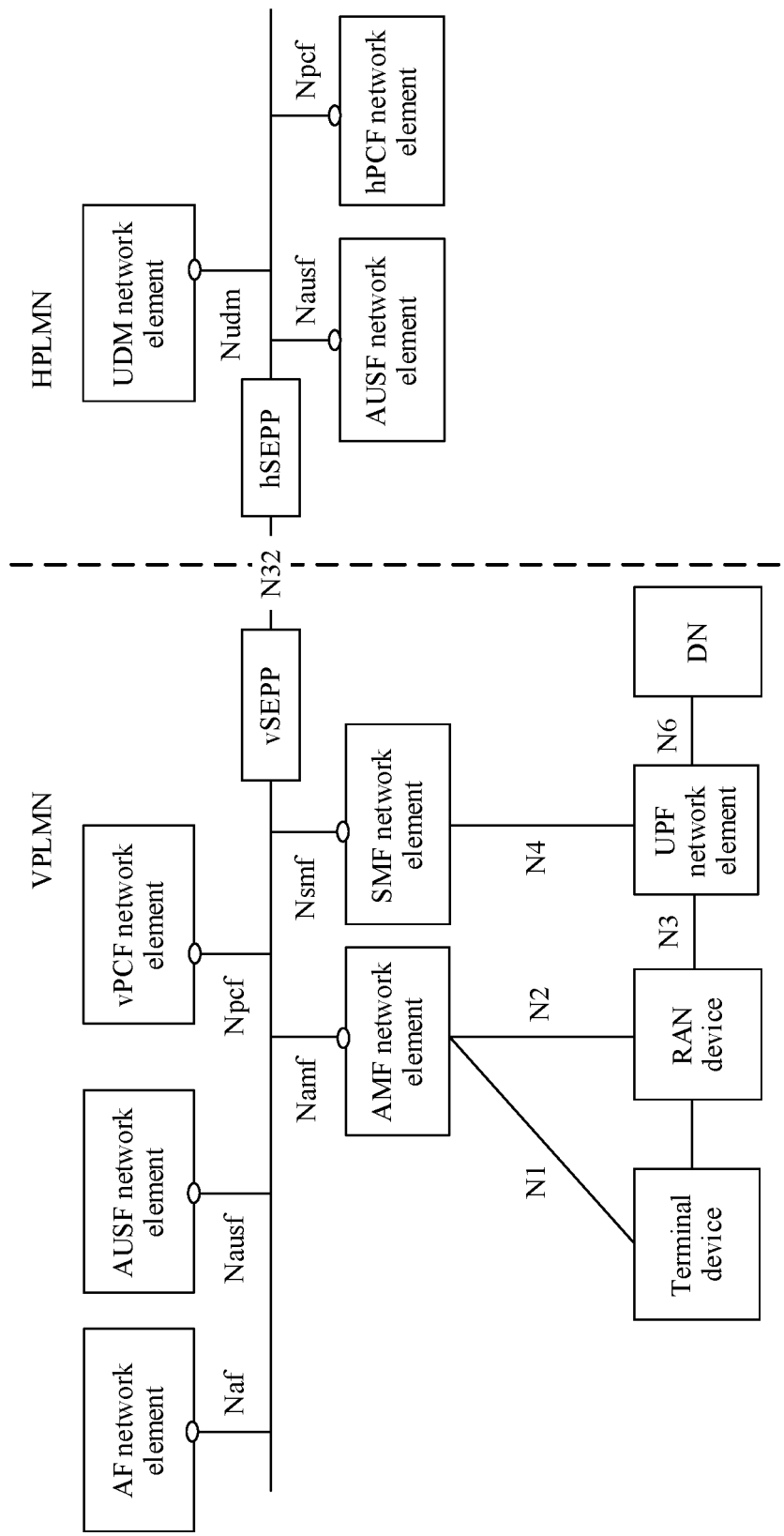
FIG. 8b shows a schematic diagram of a 5G network architecture 2 in a local breakout roaming scenario according to an embodiment of this application.

In addition, it should be noted that control plane network elements such as the AMF network element, the SMF network element, the UDM network element, the AUSF network element, the vPCF network element, the AF network element, and the hPCF network element in the local breakout roaming 5G network architecture shown in FIG. 8a may alternatively interact with each other through service-oriented interfaces. For example, as shown in FIG. 8b, an external service-oriented interface provided by the AMF network element may be Namf, an external service-oriented interface provided by the SMF network element may be Nsmf, an external service-oriented interface provided by the UDM network element may be Nudm, an external service-oriented interface provided by the vPCF network element may be Npcf, an external service-oriented interface provided by the hPCF network element may be Npcf, an external service-oriented interface provided by the AUSF network element may be Nausf, and an external service-oriented interface provided by the AF network element may be Naf. In addition, a visited security edge protection proxy (vSEPP) in FIG. 8b is configured to perform information filtering, policy control, topology hiding, and the like on an internal control plane interface of the VPLMN, and a home security edge protection proxy (hSEPP) in FIG. 8b is configured to perform information filtering, policy control, topology hiding, and the like on an internal control plane interface of the HPLMN. The vSEPP is connected to the hSEPP through an N32 interface (N32 for short). For all related description, refer to a 5G system architecture in the standard 23501. Details are not described herein.

Figure 9A:
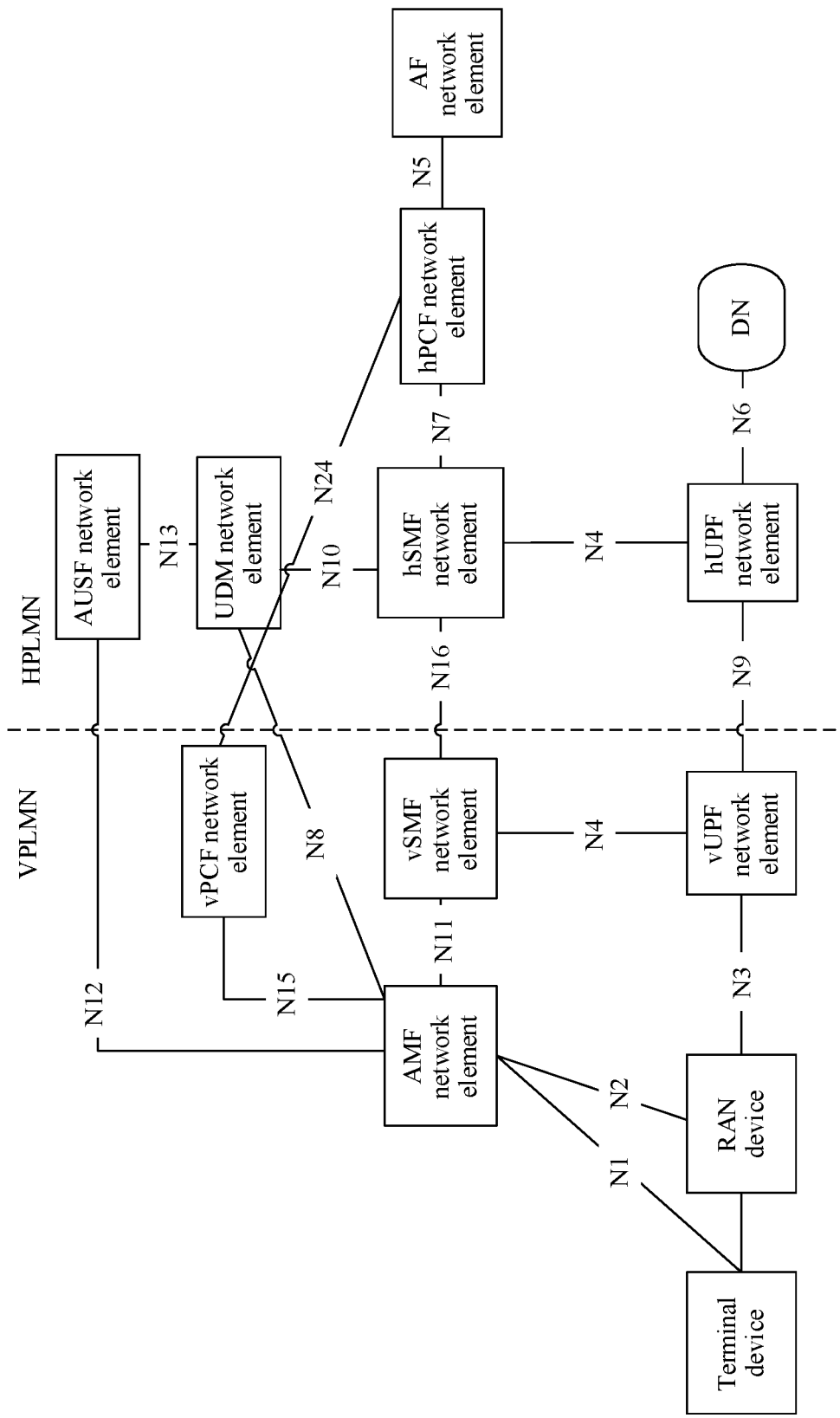
FIG. 9a shows a schematic diagram of a 5G network architecture 1 in a home routed roaming scenario according to an embodiment of this application.

Alternatively, for example, assuming that the communication system 50 shown in FIG. 5 or the communication system 60 shown in FIG. 6 is used in a 5G network architecture in a home routed (home routed) roaming scenario, as shown in FIG. 9a, a network element or an entity corresponding to the session management network element may be a home SMF (hSMF) network element in the home routed roaming 5G network architecture, a network element or an entity corresponding to the policy control network element may be an hPCF network element in the home routed roaming 5G network architecture, a network element or an entity corresponding to the user plane network element may be a home UPF (hUPF) network element in the home routed roaming 5G network architecture, and a network element or an entity corresponding to the application network element may be an AF network element in the home routed roaming 5G network architecture.

In addition, as shown in FIG. 9a, the home routed roaming 5G network architecture may further include a RAN device, a visited UPF (vUPF) network element, a visited SMF (vSMF) network element, an AMF network element, a UDM network element, a vPCF network element, an AUSF network element, or the like. This is not specifically limited in this embodiment of this application. The UDM network element, the AUSF network element, the hSMF network element, the hPCF network element, the hUPF network element, or the AF network element belongs to an HPLMN. The RAN device, the AMF network element, the vSMF network element, the vUPF network element, or the vPCF network element belongs to a VPLMN.

A terminal device communicates with the AMF network element through an N1 interface (N1 for short). The RAN device communicates with the AMF network element through an N2 interface (N2 for short), and the RAN device communicates with the vUPF network element through an N3 interface (N3 for short). The vUPF network element communicates with the hUPF network element through an N9 interface (N9 for short). The hUPF network element communicates with a DN through an N6 interface (N6 for short). The AMF network element communicates with the vSMF network element through an N11 interface (N11 for short). The vSMF network element communicates with the hSMF network element through an N16 interface (N16 for short). The AMF network element communicates with the UDM network element through an N8 interface (N8 for short), the AMF network element communicates with the AUSF network element through an N12 interface (N12 for short), and the AMF network element communicates with the vPCF network element through an N15 interface (N15 for short). The vPCF network element communicates with the hPCF network element through an N24 interface (N24 for short). The vSMF network element communicates with the vUPF network element through an N4 interface (N4 for short). The hSMF network element communicates with the hUPF network element through an N4 interface (N4 for short), the hSMF network element communicates with the UDM network element through an N10 interface (N10 for short), and the hSMF network element communicates with the hPCF network element through an N7 interface (N7 for short). The UDM network element communicates with the AUSF network element through an N13 interface (N13 for short). The h-PCF network element communicates with the AF network element through an N5 interface (N5 for short).

Figure 9B:
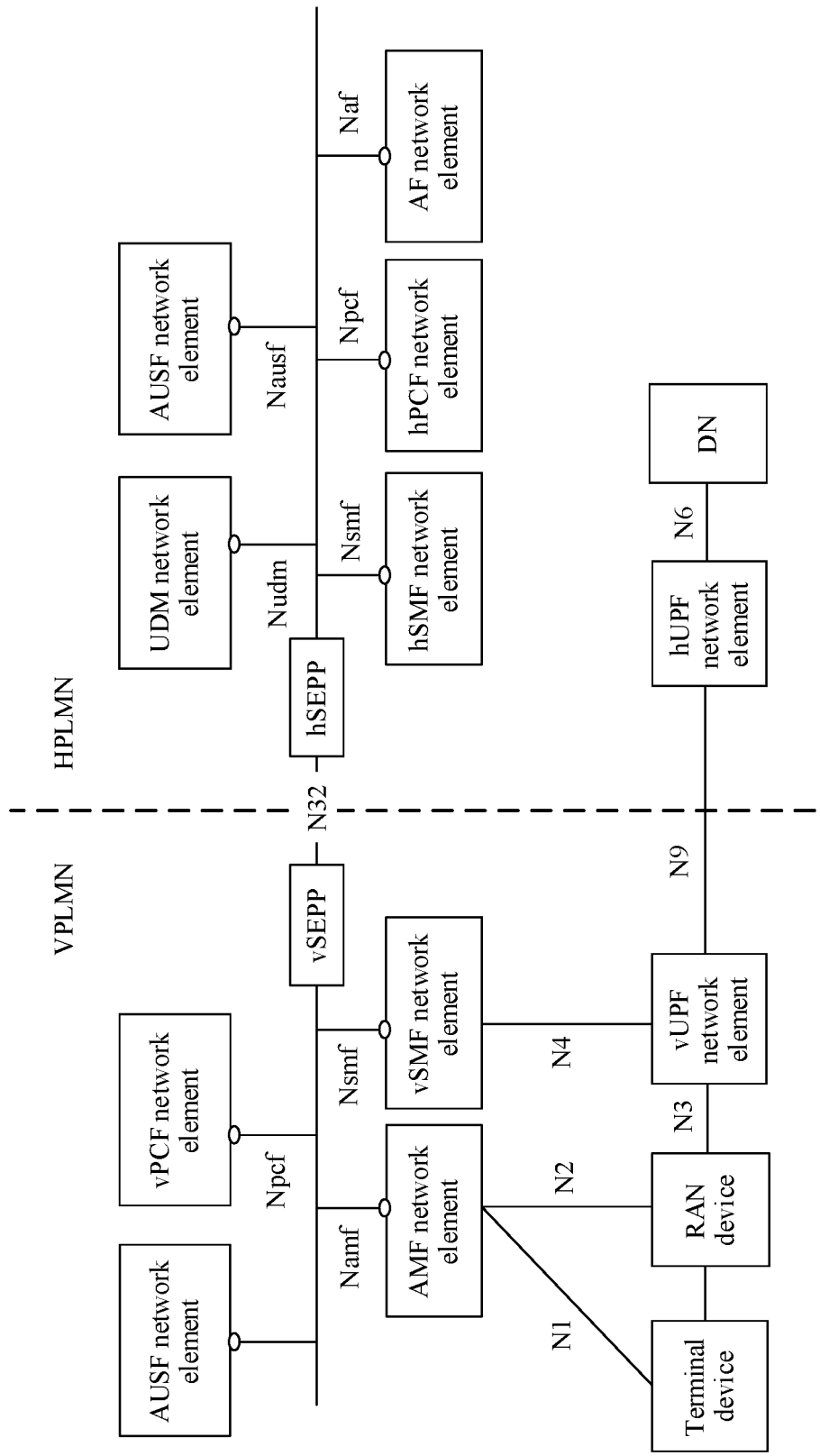
FIG. 9b shows a schematic diagram of a 5G network architecture 2 in a home routed roaming scenario according to an embodiment of this application.

In addition, it should be noted that control plane network elements such as the AMF network element, the vSMF network element, the hSMF network element, the UDM network element, the AUSF network element, the vPCF network element, and the hPCF network element in the home routed roaming 5G network architecture shown in FIG. 9a may alternatively interact with each other through service-oriented interfaces. For example, as shown in FIG. 9b, an external service-oriented interface provided by the AMF network element may be Namf, an external service-oriented interface provided by the vSMF network element may be Nsmf, an external service-oriented interface provided by the hSMF network element may be Nsmf, an external service-oriented interface provided by the UDM network element may be Nudm, an external service-oriented interface provided by the vPCF network element may be Npcf, an external service-oriented interface provided by the hPCF network element may be Npcf, an external service-oriented interface provided by the AUSF network element may be Nausf, and an external service-oriented interface provided by the AF network element may be Naf. In addition, a vSEPP in FIG. 9b is configured to perform information filtering, policy control, topology hiding, and the like on an internal control plane interface of the VPLMN. A hSEPP in FIG. 9b is configured to perform information filtering, policy control, topology hiding, and the like on an internal control plane interface of the HPLMN. The vSEPP is connected to the hSEPP through an N32 interface (N32 for short). For all related description, refer to a 5G system architecture in the standard 23501. Details are not described herein.

It should be noted that, in the embodiments shown in FIG. 7a to FIG. 9b, description is provided by using an example in which the application network element is the AF network element. In this case, in addition to representing a function of a control plane network element, the AF network element may further represent a function of an application server (AS). That is, the application network element in the embodiments of this application may alternatively be an AF network element integrating an AS function. Certainly, the application network element in the embodiments of this application may alternatively be an AS integrating an AF network element function. Alternatively, the AF network element and an AS may be independently deployed. In this scenario, the application network element in the embodiments of this application includes the AF network element and/or the AS, where the AF network element performs a control plane interaction procedure, and the AS performs a user plane interaction procedure. Unified description is provided herein, and details are not described below again.

Optionally, the terminal device in the embodiments of this application may be a device configured to implement a wireless communication function, for example, a terminal or a chip that may be used in the terminal. The terminal may be user equipment (UE), an access terminal, a terminal unit, a terminal station, a mobile station, a mobile station, a remote station, a remote terminal, a mobile device, a wireless communication device, a terminal agent, a terminal apparatus, or the like in a 5G network or a future evolved PLMN. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (VR) terminal device, an augmented reality (AR) terminal device, a wireless terminal in industrial control, a wireless terminal in self driving (self driving), a wireless terminal in telemedicine (remote medical), a wireless terminal in a smart grid (smart grid), a wireless terminal in transportation safety, a wireless terminal in a smart city, a wireless terminal in a smart home (smart home), or the like. The terminal may be movable or fixed.

Optionally, the RAN device in the embodiments of this application is a device that accesses a core network. For example, the RAN device may be a base station, a broadband network gateway (BNG), an aggregation switch, or a non-3rd generation partnership project (3GPP) access device. There may be various forms of base stations, for example, a macro base station, a micro base station (also referred to as a small cell), a relay station, and an access point.

Optionally, the session management network element, the user plane network element, the policy control network element, or the application network element in the embodiments of this application may also be referred to as a communication apparatus, and may be a general-purpose device or a special-purpose device. This is not specifically limited in the embodiments of this application.

Optionally, a related function of the session management network element, the user plane network element, the policy control network element, or the application network element in the embodiments of this application may be implemented by one device, may be jointly implemented by a plurality of devices, or may be implemented by one or more functional modules in one device. This is not specifically limited in the embodiments of this application. It may be understood that the foregoing function may be a network element in a hardware device, a software function running on dedicated hardware, a combination of hardware and software, or a virtualization function instantiated on a platform (for example, a cloud platform).

Figure 10:
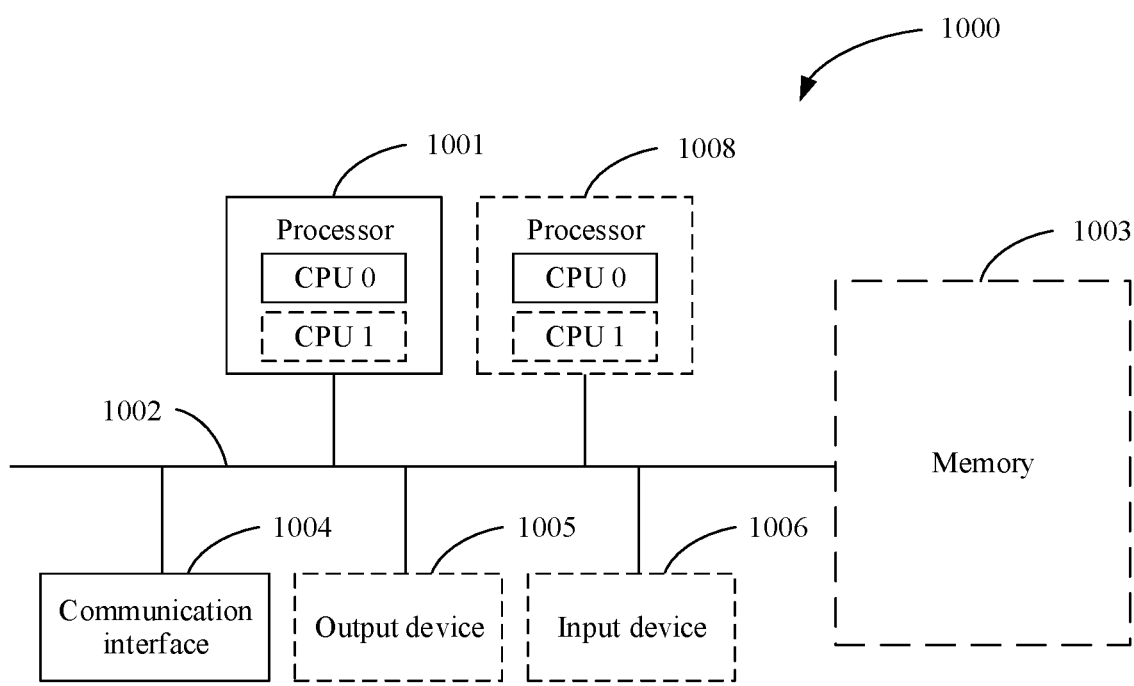
FIG. 10 is a schematic diagram of a structure of a communication device according to an embodiment of this application.

For example, the related function of the session management network element, the user plane network element, the policy control network element, or the application network element in the embodiments of this application may be implemented by a communication device 1000 in FIG. 10. FIG. 10 is a schematic diagram of a structure of the communication device 1000 according to an embodiment of this application. The communication device 1000 includes one or more processors 1001, a communication line 1002, and at least one communication interface (a communication interface 1004 and one processor 1001 are merely used as an example in FIG. 10 for description). Optionally, the communication device 1000 may further include a memory 1003.

The processor 1001 may be a general-purpose central processing unit (CPU), a microprocessor, an application-specific integrated circuit (ASIC), or one or more integrated circuits configured to control program execution in the solutions of this application.

The communication line 1002 may include a path for connecting different components.

The communication interface 1004 may be a transceiver module, configured to communicate with another device or a communication network, for example, the Ethernet, a RAN, or a wireless local area network (WLAN). For example, the transceiver module may be an apparatus such as a transceiver or a transceiver machine. Optionally, the communication interface 1004 may alternatively be a transceiver circuit located in the processor 1001, to implement signal input and signal output of the processor.

The memory 1003 may be an apparatus having a storage function. For example, the memory 1003 may be a read-only memory (ROM) or another type of static storage device that can store static information and instructions, or a random access memory (RAM) or another type of dynamic storage device that can store information and instructions. The memory 1003 may alternatively be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in an instruction form or a data structure form and that can be accessed by a computer. However, the memory 1003 is not limited thereto. The memory may exist independently, and is connected to the processor through the communication line 1002. The memory may alternatively be integrated with the processor.

The memory 1003 is configured to store computer-executable instructions for executing the solutions of this application, and the processor 1001 controls the execution. The processor 1001 is configured to execute the computer-executable instructions stored in the memory 1003, to implement a QoS information notification method provided in the embodiments of this application.

Alternatively, optionally, in this embodiment of this application, the processor 1001 may perform processing related functions in a QoS information notification method provided in the following embodiments in this application, and the communication interface 1004 is responsible for communication with the another device or the communication network. This is not specifically limited in this embodiment of this application.

Optionally, the computer-executable instructions in this embodiment of this application may also be referred to as application program code. This is not specifically limited in this embodiment of this application.

During specific implementation, in an embodiment, the processor 1001 may include one or more CPUs, such as a CPU 0 and a CPU 1 in FIG. 10.

During specific implementation, in an embodiment, the communication device 1000 may include a plurality of processors, such as the processor 1001 and a processor 1008 in FIG. 10. Each of these processors may be a single-core (single-core) processor or a multi-core (multi-core) processor. The processor herein may include but is not limited to at least one of the following various computing devices that run software: a central processing unit (CPU), a microprocessor, a digital signal processor (DSP), a microcontroller unit (MCU), an artificial intelligence processor, or the like. Each computing device may include one or more cores configured to perform an operation or processing by executing software instructions.

During specific implementation, in an embodiment, the communication device 1000 may further include an output device 1005 and an input device 1006. The output device 1005 communicates with the processor 1001, and may display information in a plurality of manners. For example, the output device 1005 may be a liquid crystal display (LCD), a light emitting diode (LED) display device, a cathode ray tube (CRT) display device, or a projector. The input device 1006 communicates with the processor 1001, and may receive input of a user in a plurality of manners. For example, the input device 1006 may be a mouse, a keyboard, a touchscreen device, or a sensor device.

The communication device 1000 may also be referred to as a communication apparatus sometimes, and may be a general-purpose device or a special-purpose device. For example, the communication device 1000 may be a desktop computer, a portable computer, a network server, a palmtop computer (PDA), a mobile phone, a tablet computer, a wireless terminal device, an embedded device, the foregoing terminal device, the foregoing network device, or a device having a structure similar to that in FIG. 10. A type of the communication device 1000 is not limited in this embodiment of this application.

With reference to FIG. 1 to FIG. 10, the following specifically describes the charging rule binding method provided in the embodiments of this application.

It should be noted that a name of a message between network elements or a name of each parameter in a message in the following embodiments of this application is merely an example, and may alternatively be another name during specific implementation. This is not specifically limited in the embodiments of this application.

Figure 11:
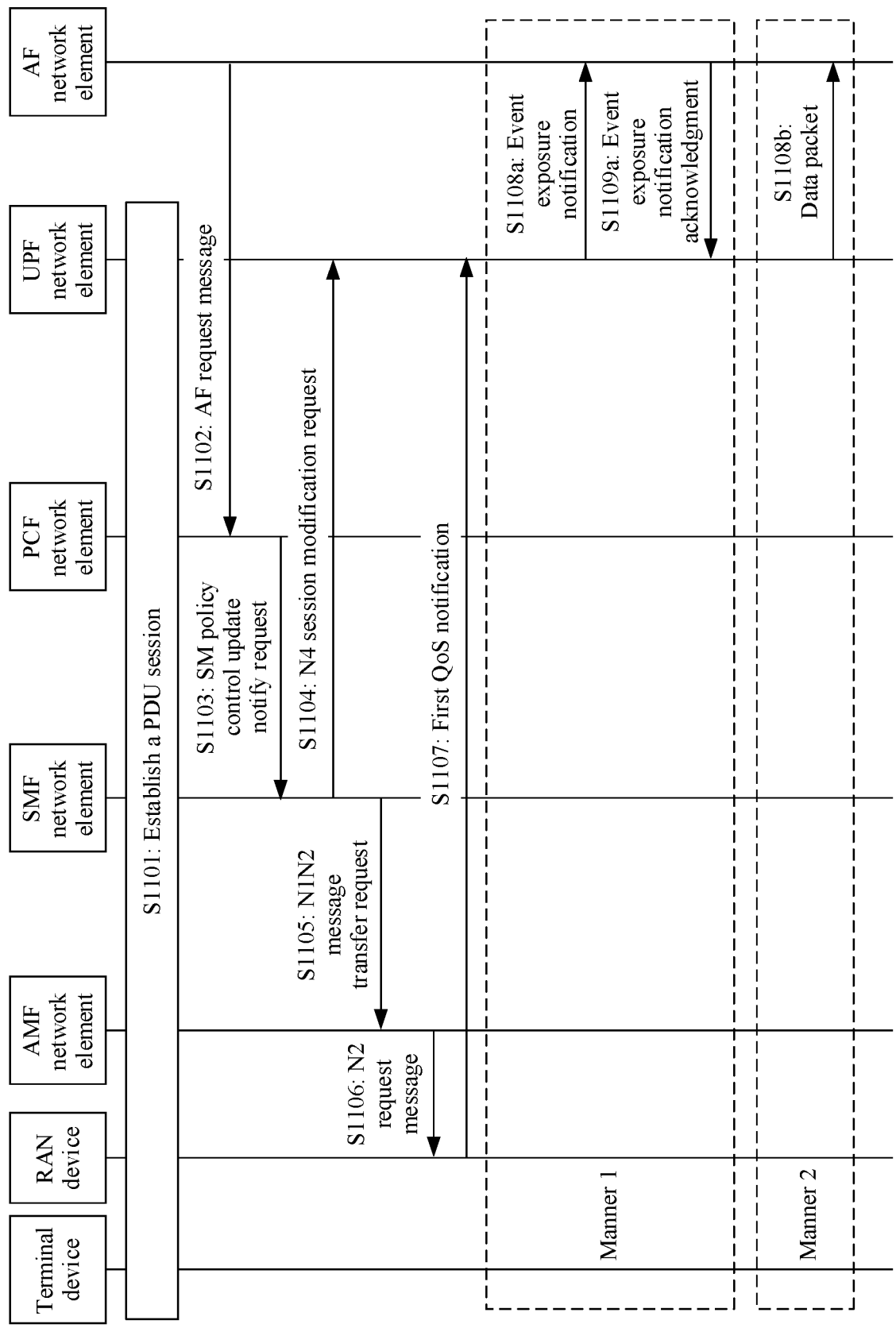
FIG. 11 is a schematic flowchart of a QoS information notification method according to an embodiment of this application.

First, using an example in which the communication system shown in FIG. 5 or FIG. 6 is used in the 5G network architecture in the non-roaming scenario shown in FIG. 7a or FIG. 7b, FIG. 11 shows a QoS information notification method according to an embodiment of this application. The QoS information notification method includes the following steps.

S1101: A terminal device initiates a PDU session establishment procedure, and successfully establishes a PDU session.

S1102: An AF network element sends an AF request message to a PCF network element. Correspondingly, the PCF network element receives the AF request message from the AF network element.

The AF request message includes indication information 1, where the indication information 1 is used to indicate that a target service needs a user plane QoS notification, or the indication information 1 is used to indicate a capability of the AF network element to support a user plane QoS notification.

In a possible implementation, in this embodiment of this application, that the indication information 1 is used to indicate that a target service needs a user plane QoS notification may be implemented in the following manner: The indication information 1 includes information about the target service and information indicating that the user plane QoS notification is required. For example, the indication information 1 includes app.1, where "app" is the information about the target service, and "1" indicates that the user plane QoS notification is required. For example, the information about the target service herein may include a service data flow template, an AF application identifier), an AF service identifier, or an AF communication service identifier.

Optionally, the indication information 1 in this embodiment of this application may alternatively not include the information about the target service. In this case, the AF request message further needs to include the information about the target service in addition to the indication information 1. For the information about the target service, refer to the related example of "app" in the foregoing indication information 1. Details are not described herein again.

Certainly, in this embodiment of this application, the AF request message may alternatively not include the indication information 1, but a new type of request is introduced for indication. To be specific, a type of the AF request message is used to indicate that the AF network element needs a user plane QoS notification, or indicate the capability of the AF network element to support the user plane QoS notification. This is not specifically limited in this embodiment of this application.

Optionally, the indication information 1 in this embodiment of this application may also be referred to as third indication information. This is not specifically limited in this embodiment of this application.

Optionally, the AF request message in this embodiment of this application may further include an identifier of the AF network element, where the identifier of the AF network element is used by another network element to subsequently address the AF network element. For example, the identifier of the AF network element may be implemented by using a fully qualified domain name (FQDN).

Optionally, in this embodiment of this application, the AF request message may further include: subscribing to whether quality of service of the target service meets a QoS requirement (for example, whether a latency or bandwidth meets the QoS requirement), subscribing to whether a path of the subscribed target service is congested (for example, a congestion level), or subscribing to QoS monitoring information or the like. This is not specifically limited in this embodiment of this application.

S1103: The PCF network element sends a session management (SM) policy control update notify request to an SMF network element based on the AF request message. Correspondingly, the SMF network element receives the SM policy control update notify request from the PCF network element.

The SM policy control update notification request includes a PCC rule or policy information related to the PDU session. The PCC rule or the policy information related to the PDU session includes indication information 2, where the indication information 2 is used to indicate that the target service needs the user plane QoS notification.

In a possible implementation, in this embodiment of this application, that the indication information 2 is used to indicate that the target service needs the user plane QoS notification may be implemented in the following manner: The indication information 2 includes information about the target service and information indicating that the user plane QoS notification is required. For example, the indication information 2 includes app.1, where "app" is the information about the target service, and "1" indicates that the user plane QoS notification is required. For example, the information about the target service herein may include the service data flow template, the AF application identifier, the AF service identifier, or the AF communication service identifier. It should be noted that the information about the target service in step S1103 may be the same as or different from the information about the target service in step S1102. This is not specifically limited in this embodiment of this application.

Optionally, the indication information 2 in this embodiment of this application may alternatively not include the information about the target service. In this case, the PCC rule or the policy information related to the PDU session further needs to include the information about the target service in addition to the indication information 1. For the information about the target service, refer to the related example of "app" in the foregoing indication information 2. Details are not described herein again.

Optionally, the indication information 2 in this embodiment of this application may also be referred to as fourth indication information. This is not specifically limited in this embodiment of this application.

It should be noted that the indication information 2 in this embodiment of this application may be the same as the indication information 1, or may be different from the indication information 1. This is not specifically limited in this embodiment of this application.

Optionally, in this embodiment of this application, the indication information 2 in the PCC rule may be used as a binding parameter for QoS flow binding. Unified description is provided herein, and this is not specifically limited in this embodiment of this application.

Optionally, in this embodiment of this application, if the AF request message includes the identifier of the AF network element, the SM policy control update notify request further includes the identifier of the AF network element. Unified description is provided herein, and details are described below again.

S1104: The SMF network element sends an N4 session modification request to a UPF network element based on the indication information 2. Correspondingly, the UPF network element receives the N4 session modification request from the SMF network element.

The N4 session modification request includes indication information 3, where the indication information 3 is used to indicate that the target service needs the user plane QoS notification.

In a possible implementation, in this embodiment of this application, that the indication information 3 is used to indicate that the target service needs the user plane QoS notification may be implemented in the following manner: The indication information 3 includes information about the target service and information indicating that the user plane QoS notification is required. For example, the indication information 3 includes app.1, where "app" is the information about the target service, and "1" indicates that the user plane QoS notification is required. For example, the information about the target service herein may include the service data flow template, the AF application identifier, the AF service identifier, or the AF communication service identifier. It should be noted that the information about the target service in step S1104 may be the same as or different from the information about the target service in step S1103. This is not specifically limited in this embodiment of this application.

Optionally, the indication information 3 in this embodiment of this application may alternatively not include the information about the target service. In this case, the N4 session modification request further needs to include the information about the target service in addition to the indication information 3. For the information about the target service, refer to the related example of "app" in the foregoing indication information 3. Details are not described herein again.

Optionally, the indication information 3 in this embodiment of this application may also be referred to as second indication information. This is not specifically limited in this embodiment of this application.

It should be noted that the indication information 3 in this embodiment of this application may be the same as the indication information 2, or may be different from the indication information 2. This is not specifically limited in this embodiment of this application.

Optionally, the N4 session modification request in this embodiment of this application may further include a traffic filter corresponding to the target service. In a standard, the traffic filter may be implemented by using a packet detection rule (for example, a packet filter set included in the packet detection rule). For details, refer to an existing implementation. This is not specifically limited in this embodiment of this application.

Optionally, in this embodiment of this application, if the SM policy control update notify request includes the identifier of the AF network element, the N4 session modification request may further include the identifier of the AF network element, where the identifier of the AF network element is used by the UPF network element to find the corresponding AF for communication. Unified description is provided herein, and details are not described below again.

Optionally, in an implementation, the AF network element may not subscribe to user plane QoS notification reporting from the UPF network element through a control plane (where the foregoing steps S1102 to S1104 are performed through the control plane), but directly subscribe to the user plane QoS notification reporting from the UPF network element (for example, an anchor UPF network element transmitting application data) through a user plane. This is not specifically limited in this embodiment of this application. In addition, the AF network element may alternatively subscribe to the user plane QoS notification reporting from the UPF network element through another network element with a relatively low location. The another network element with a relatively low location herein may be, for example, a MEC server or the SMF network element. Certainly, if the AF network element is untrusted, a network exposure function (NEF) network element is further required for relay. Unified description is provided herein, and details are not described below again. In a possible implementation, subscription information includes indication information 6, where the indication information 6 is used to indicate that the target service needs the user plane QoS notification. That the indication information 6 is used to indicate that the target service needs the user plane QoS notification may be implemented in the following manner: The indication information 6 includes information about the target service and information indicating that the user plane QoS notification is required. For example, the indication information 6 includes app.1, where "app" is the information about the target service, and "1" indicates that the user plane QoS notification is required. For example, the information about the target service herein may include the service data flow template, the AF application identifier, the AF service identifier, or the AF communication service identifier.

Optionally, the indication information 6 may alternatively not include the information about the target service. In this case, the subscription information further needs to include the information about the target service in addition to the indication information 6. For the information about the target service, refer to the related example of "app" in the foregoing indication information 6. Details are not described herein again.

S1105: The SMF network element sends an N1N2 message transfer request to an AMF network element. Correspondingly, the AMF network element receives the N1N2 message transfer request from the SMF network element.

Optionally, the N1N2 message transfer request may include indication information 4, where the indication information 4 is used to indicate that a target QoS flow in which the target service is located needs a user plane QoS notification.

In a possible implementation, in this embodiment of this application, that the indication information 4 is used to indicate that a target QoS flow in which the target service is located needs a user plane QoS notification may be implemented in the following manner: The indication information 4 includes information about the target QoS flow and information indicating that the user plane QoS notification is required. The information about the target QoS flow may be, for example, an identifier of the target QoS flow.

Optionally, the indication information 4 in this embodiment of this application may alternatively not include the information about the target QoS flow. In this case, the N1N2 message transfer request further needs to include the information about the target QoS flow in addition to the indication information 4. Unified description is provided herein, and details are not described below again.

Optionally, the indication information 4 in this embodiment of this application may also be referred to as fifth indication information. This is not specifically limited in this embodiment of this application.

S1106: The AMF network element sends an N2 request message to a RAN device. Correspondingly, the RAN device receives the N2 request message from the AMF network element.

Optionally, if the N1N2 message transfer request may include the indication information 4, the N2 request message includes the indication information 4.

Certainly, step S1105 and step S1106 may further include information used to update a QoS profile on the RAN device, information used to update a QoS rule on the terminal device, tunnel information, or the like. For details, refer to an existing implementation. The details are not described herein again.

Optionally, the indication information 4 may be carried in the information used to update the QoS profile on the RAN device (for example, an updated QoS profile). This is not specifically limited in this embodiment of this application.

S1107: The RAN device sends a first QoS notification to the UPF network element based on the indication information 4. Correspondingly, the UPF network element receives the first QoS notification from the RAN device. The first QoS notification includes first QoS information of the target QoS flow in which the target service is located.

In a possible implementation, the RAN device may send the first QoS notification to the UPF network element through a user plane (for example, a GTP-U tunnel). For example, the first QoS notification is included in a data packet sent by the RAN device to the UPF network element.

In another possible implementation, the RAN device may send the first QoS notification to the SMF network element in a manner in a conventional technology, and then the SMF network element sends the first QoS notification to the UPF network element. For example, the first QoS notification is included in signaling sent by the SMF network element to the UPF network element.

It should be noted that in this embodiment of this application, description is provided by using an example in which the UPF network element receives the first QoS notification from the RAN device, where first QoS information that is included in the first QoS notification and that is used to indicate the QoS of the target service is the first QoS information of the target QoS flow in which the target service is located. Certainly, when another network element also subscribes to the user plane QoS notification reporting, the UPF network element may alternatively receive the first QoS notification from the another network element. In this case, the first QoS information that is included in the first QoS notification and that is used to indicate the QoS of the target service may be the first QoS information of the target QoS flow in which the target service is located, or may be first QoS information of the target service. Whether the first QoS notification includes the first QoS information of the target QoS flow in which the target service is located or the first QoS information of the target service depends on the another network element. For example, if the another network element can identify only a QoS flow but cannot identify a service, the first QoS information that is included in the first QoS notification and that is used to indicate the QoS of the target service may be the first QoS information of the target QoS flow in which the target service is located. Alternatively, if the another network element can identify a service, the first QoS information that is included in the first QoS notification and that is used to indicate the QoS of the target service may be the first QoS information of the target service. When the UPF network element receives the first QoS notification from the another network element, the foregoing steps S1105 to S1107 are optional steps. Unified description is provided herein, and details are not described below again.

In addition, in this embodiment of this application, the UPF network element may alternatively determine the first QoS notification autonomously according to a local policy. This is not specifically limited in this embodiment of this application.

Optionally, in this embodiment of this application, the first QoS information of the target QoS flow may include: quality of service of the target QoS flow cannot meet a QoS requirement (for example, a GFBR cannot meet the QoS requirement); quality of service of the target QoS flow has met a QoS requirement (for example, a GFBR can meet the QoS requirement); a path of the target QoS flow is congested (for example, a congestion level); an operation indication (for example, a traffic increase or a traffic decrease) related to the target QoS flow; or the like. This is not specifically limited in this embodiment of this application.

Optionally, in this embodiment of this application, the first QoS information of the target service may include: the quality of service of the target service cannot meet the QoS requirement (for example, the latency or the bandwidth cannot meet the QoS requirement); the quality of service of the target service has met the QoS requirement (for example, the latency or the bandwidth can meet the QoS requirement); the service path of the target service is congested (for example, the congestion level); an operation indication (for example, a traffic increase or a traffic decrease) related to the target service; or the like. This is not specifically limited in this embodiment of this application.

The following provides several possible implementations of reporting QoS notification information.

Manner 1: As shown in FIG. 11, the QoS information notification method provided in this embodiment of this application further includes the following steps.

S1108a: The UPF network element sends an event exposure notification to the AF network element to which a QoS notification needs to be reported. Correspondingly, the AF network element receives the event exposure notification from the UPF network element.

The event exposure notification includes indication information 5, where the indication information 5 is used to indicate information about a second QoS notification, the second QoS notification includes second QoS information of the target service, and the first QoS notification is the same as the second QoS notification, or the second QoS notification is determined based on the first QoS notification.

For example, assuming that the first QoS notification includes the first QoS information of the target QoS flow in which the target service is located, the second QoS notification may be determined based on the first QoS notification. For example, if the first QoS information of the target QoS flow includes that the quality of service of the target QoS flow cannot meet the QoS requirement (for example, the GFBR cannot meet the QoS requirement), the UPF network element may determine that the quality of service of the target service cannot meet the QoS requirement (for example, the latency or the bandwidth cannot meet the QoS requirement). Alternatively, if the first QoS information of the target QoS flow includes that the quality of service of the target QoS flow has met the QoS requirement (for example, the GFBR can meet the QoS requirement), the UPF network element may determine that the quality of service of the target service has met the QoS requirement (for example, the latency or the bandwidth can meet the QoS requirement). Alternatively, if the first QoS information of the target QoS flow includes that the path of the target QoS flow is congested (for example, the congestion level), the UPF network element may determine that the service path of the target service is congested (for example, the congestion level). Alternatively, if the first QoS information of the target QoS flow includes the operation indication (for example, the traffic increase or the traffic decrease) related to the target QoS flow, the UPF network element may determine the operation indication (for example, the traffic increase or the traffic decrease) related to the target service. That is, in this embodiment of this application, the second QoS information of the target service may include: the quality of service of the target service cannot meet the QoS requirement (for example, the latency or the bandwidth cannot meet the QoS requirement); the quality of service of the target service has met the QoS requirement (for example, the latency or the bandwidth can meet the QoS requirement); the service path of the target service is congested (for example, the congestion level); the operation indication (for example, the traffic increase or the traffic decrease) related to the target service; or the like. This is not specifically limited in this embodiment of this application.

For example, assuming that the first QoS notification includes the first QoS information of the target service, the second QoS notification may be determined based on the first QoS notification, or the second QoS notification may be the same as the first QoS notification. For example, after obtaining the first QoS information of the target service, the UPF network element may directly use the first QoS information of the target service as the second QoS information of the target service. In this case, the first QoS notification is the same as the second QoS notification. For related description of the second QoS information of the target service, refer to the foregoing related description of the first QoS information of the target service. Details are not described herein again. Alternatively, for example, after obtaining the first QoS information of the target service, the UPF network element may perform internal conversion on the first QoS information of the target service, to obtain the second QoS information of the target service. For example, information about the target service included in the first QoS information of the target service may be an identifier of the target service, for example, 5-tuple information or 3-tuple information, and information about the target service included in the second QoS information of the target service may include, for example, the service data flow template, the AF application identifier, the AF service identifier, or the AF communication service identifier. In this case, the second QoS notification is determined based on the first QoS notification, and the second QoS information of the target service may include: the quality of service of the target service cannot meet the QoS requirement (for example, the latency or the bandwidth cannot meet the QoS requirement); the quality of service of the target service has met the QoS requirement (for example, the latency or the bandwidth can meet the QoS requirement); the service path of the target service is congested (for example, the congestion level); the operation indication (for example, the traffic increase or the traffic decrease) related to the target service; or the like. This is not specifically limited in this embodiment of this application.

Optionally, the indication information 5 in this embodiment of this application may also be referred to as first indication information. This is not specifically limited in this embodiment of this application.

Optionally, in this embodiment of this application, the UPF network element may directly determine, based on the identifier of the AF network element that subscribes to the QoS notification reporting, the AF network element to which a QoS notification needs to be reported. In other words, an AF network element corresponding to the identifier of the AF network element that subscribes to the QoS notification reporting is determined as the AF network element to which a QoS notification needs to be reported. Alternatively, optionally, in this embodiment of this application, the UPF network element may first determine AF network elements corresponding to the target service to which the first QoS notification is specific (for example, AF network elements corresponding to a service that is on the GTP-U tunnel (for example, when the notification comes from the RAN device) or on the session (for example, when the notification comes from the SMF network element) and to which the first QoS notification is specific) or AF network elements corresponding to a service in the target QoS flow in which the target service to which the first QoS notification is specific is located (for example, when the notification comes from the RAN device). Then, the UPF network element determines, based on the identifier of the AF network element that subscribes to the QoS notification reporting, the AF network element that has subscribed to the QoS notification reporting among these AF network elements as the AF network element to which a QoS notification needs to be reported. This is not specifically limited in this embodiment of this application. For example, a PDU session includes a QoS flow A (including a service 1, a service 2, and a service 3) and a QoS flow B (including a service 4 and a service 5), where QoS notification reporting is subscribed to for the service 1 and the service 5. In this case, if a network element notifies the UPF network element that a GFBR of the QoS flow A cannot be met, the UPF network element may determine that the AF network element to which a QoS notification needs to be reported is an AF network element corresponding to the service 1.

S1109a: The AF network element sends an event exposure notification acknowledgment (event exposure notify ack) to the UPF network element. Correspondingly, the UPF network element receives the event exposure notification acknowledgment from the AF network element.

Figure 12:
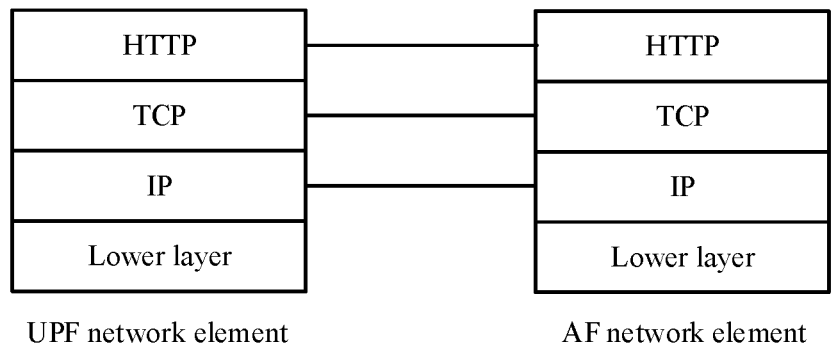
FIG. 12 is a schematic diagram of protocol stack structures of control plane protocol stacks of a UPF network element and an AF network element according to an embodiment of this application.

Optionally, in this embodiment of this application, control plane protocol stacks of the UPF network element and the AF network element may be those shown in FIG. 12. The UPF network element includes lower layers, an internet protocol (IP) layer, a transmission control protocol (TCP) layer, and a hypertext transfer protocol (HTTP) layer. The AF network element includes lower layers, an IP layer, a TCP layer, and an HTTP layer. The IP layer of the UPF network element communicates with the IP layer of the AF network element, the TCP layer of the UPF network element communicates with the TCP layer of the AF network element, and the HTTP layer of the UPF network element communicates with the HTTP layer of the AF network element.

Step S1108a and step S1109a are described by using an example in which the UPF network element may directly communicate with the AF network element. Certainly, the UPF network element may alternatively report the indication information 5 to the AF network element through another network element. In this case, a message sent by the UPF network element to the another network element further needs to include information about the AF network element in addition to the indication information 5, so that the another network element can identify, based on the information about the AF network element, an AF network element to which the indication information 5 needs to be reported. This case is not specifically limited in this embodiment of this application. For example, the another network element herein may be the MEC server or the SMF network element. Certainly, if the AF network element is untrusted, the NEF network element is further required for relay. Unified description is provided herein, and details are not described below again.

Manner 2: As shown in FIG. 11, the QoS information notification method provided in this embodiment of this application further includes the following steps.

S1108b: The UPF network element sends a data packet to the AF network element to which a QoS notification needs to be reported. Correspondingly, the AF network element receives the data packet from the UPF network element.

The data packet includes indication information 5, where the indication information 5 is used to indicate information about a second QoS notification, the second QoS notification includes second QoS information of the target service, and the first QoS notification is the same as the second QoS notification, or the second QoS notification is determined based on the first QoS notification.

For related description of the indication information 5, the second QoS information of the target service, and a manner in which the UPF network element determines the AF network element to which a QoS notification needs to be reported, refer to the foregoing manner 1. Details are not described herein again.

Optionally, in this embodiment of this application, in the manner in which the data packet includes the indication information 5, the indication information 5 may directly arrive at the AF network element through an existing data plane (for example, through an IP route or an Ethernet protocol). Unified description is provided herein, and details are not described below again.

In a possible implementation, the indication information 5 in this embodiment of this application may be an explicit congestion notification (ECN) flag. In an existing ECN flag, two least significant bits (rightmost bits) in a type of service (ToS) field (at the ninth to the sixteenth bits) in an internet protocol version 4 (IPv4) header or an IPv6 header are encoded to represent four status codes:

00—non ECN capable transport, non-ECT;
10—ECN capable transport, ECT(0);
01—ECN capable transport, ECT(1); and
11—congestion experienced, congestion explicit (CE).

In this embodiment of this application, a meaning of the ECN flag may be extended as follows:

00—non ECN capable transport, non-ECT;
10—a GFBR or bandwidth can meet a QoS requirement;
01—a GFBR or bandwidth can meet a QoS requirement; and
11—a GFBR or bandwidth cannot be met.

In another possible implementation, the indication information 5 in this embodiment of this application may be a segment identifier in an SRv6 extension header. That is, a header of the data packet is the SRv6 extension header, the SRv6 extension header includes the segment identifier, and the segment identifier is used to indicate the information about the second QoS notification.

Optionally, in this embodiment of this application, the segment identifier may be extended as shown in Table 1:

TABLE 1

| Function (function) | Argument (argument) |
|---|---|
| Decrease traffic or bandwidth | Decrease to: (optional) |
| Increase traffic or bandwidth | Increase to (optional) |
| Notify a corresponding AF network element (when the data packet passes through another network element) | |

Step S1108b is described by using an example in which the UPF network element may directly communicate with the AF network element. Certainly, the UPF network element may alternatively report the indication information 5 to the AF network element through another network element. In this case, a message sent by the UPF network element to the another network element further needs to include information about the AF network element in addition to the indication information 5, so that the another network element can identify, based on the information about the AF network element, an AF network element to which the indication information 5 needs to be reported. This case is not specifically limited in this embodiment of this application. For example, the another network element herein may be the MEC server or the SMF network element. Certainly, if the AF network element is untrusted, the NEF network element is further required for relay. Unified description is provided herein, and details are not described below again.

Based on the QoS information notification method provided in this embodiment of this application, the UPF network element may directly send, to the AF network element to which a QoS notification needs to be reported, the first indication information used to indicate the second QoS notification, that is, QoS notification information does not need to pass through a centralized network element (for example, the PCF network element). Therefore, a path in a QNC mechanism can be shortened, so that the AF network element can perform timely processing in response to the QoS notification information.

In addition, it can be learned from the description of the second QoS notification that, in this embodiment of this application, the UPF network element not only can implement reporting in the QNC mechanism, but also can report other information such as path congestion information and traffic. This is not specifically limited in this embodiment of this application. Further, this embodiment of this application may be applied to reporting of other information, for example, QoS information (for example, whether a cell is congested and a congestion level) of the RAN device and location information of the terminal device, to resolve a problem of path detour caused when the AF subscribes to other information. This is not specifically limited in this embodiment of this application.

Certainly, based on the description in the foregoing embodiment, the AF network element not only can implement subscription in the QNC mechanism, but also can subscribe to other information such as the path congestion information and the traffic. This is not specifically limited in this embodiment of this application. Further, the AF network element may subscribe to the QoS information of the RAN device or the location information of the terminal device, to resolve the problem of path detour caused when the AF subscribes to other information. This is not specifically limited in this embodiment of this application.

The action of the SMF network element, the PCF network element, the UPF network element, or the AF network element in steps S1101 to S1109a or S1008b may be performed by the processor 1001 in the communication device 1000 shown in FIG. 10 by invoking the application program code stored in the memory 1003. This is not limited in this embodiment.

It should be noted that the embodiment shown in FIG. 11 is described by using an example in which the communication system shown in FIG. 5 or FIG. 6 is used in the 5G network architecture in the non-roaming scenario in FIG. 7a or FIG. 7b. If description is provided by using an example in which the communication system shown in FIG. 5 or FIG. 6 is used in the local breakout roaming 5G network architecture shown in FIG. 8a or FIG. 8b or an example in which the communication system shown in FIG. 5 or FIG. 6 is used in the home routed roaming 5G network architecture shown in FIG. 9a or FIG. 9b, a corresponding QoS information notification method is similar to the method in the foregoing embodiment, and only a related network element needs to be adaptively replaced. Details are not described herein again.

It may be understood that, in the foregoing embodiments, the method and/or step implemented by the session management network element may alternatively be implemented by a component (for example, a chip or a circuit) that may be used for the session management network element, the method and/or step implemented by the user plane network element may alternatively be implemented by a component (for example, a chip or a circuit) that may be used for the user plane network element, the method and/or step implemented by the application network element may alternatively be implemented by a component (for example, a chip or a circuit) that may be used for the application network element.

The foregoing mainly describes, from the perspective of interaction between the network elements, the solutions provided in the embodiments of this application. Correspondingly, the embodiments of this application further provide a communication apparatus. The communication apparatus may be the session management network element in the foregoing method embodiment, an apparatus including the session management network element, or a component that may be used for the session management network element. Alternatively, the communication apparatus may be the user plane network element in the foregoing method embodiment, an apparatus including the user plane network element, or a component that may be used for the user plane network element. Alternatively, the communication apparatus may be the application network element in the foregoing method embodiment, an apparatus including the application network element, or a component that may be used for the application network element. It may be understood that, to implement the foregoing functions, the communication apparatus includes corresponding hardware structures and/or software modules for performing the functions. A person skilled in the art should be easily aware that, with reference to units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 13:
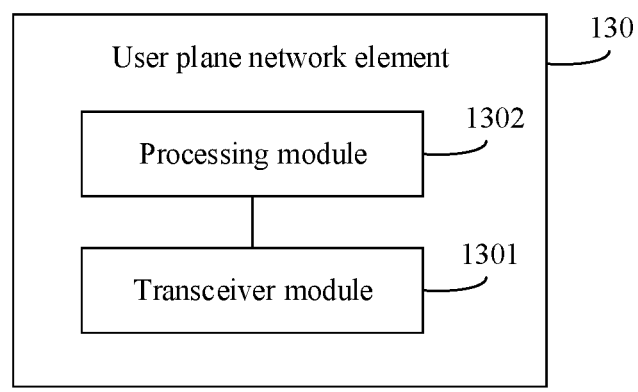
FIG. 13 is a schematic diagram of a structure of a user plane network element according to an embodiment of this application.

For example, the communication apparatus is the user plane network element in the foregoing method embodiment. FIG. 13 is a schematic diagram of a structure of a user plane network element 130. The user plane network element 130 includes a transceiver module 1301 and a processing module 1302. The transceiver module 1301 may also be referred to as a transceiver unit, and is configured to implement sending and receiving functions. For example, the transceiver module 1301 may be a transceiver circuit, a transceiver machine, a transceiver, or a communication interface.

The processing module 1302 is configured to obtain a first QoS notification, where the first QoS notification includes first QoS information used to indicate QoS of a target service. The transceiver module 1301 is configured to send first indication information to an application network element to which a QoS notification needs to be reported, where the first indication information is used to indicate a second QoS notification, the second QoS notification includes second QoS information of the target service, and the first QoS notification is the same as the second QoS notification, or the second QoS notification is determined based on the first QoS notification.

Optionally, the transceiver module 1301 is further configured to receive second indication information from a session management network element, where the second indication information is used to indicate that the target service needs a user plane QoS notification. That the transceiver module 1301 is configured to send first indication information to an application network element to which a QoS notification needs to be reported includes: The transceiver module 1301 is configured to send, based on the second indication information, the first indication information to the application network element to which a QoS notification needs to be reported.

Optionally, the transceiver module 1301 is further configured to receive, from the session management network element, information about the application network element to which a QoS notification needs to be reported.

Optionally, first indication information is a first identifier. That the transceiver module 1301 is configured to send first indication information to an application network element to which a QoS notification needs to be reported includes: The transceiver module 1301 is configured to send a first data packet of the target service to the application network element to which a QoS notification needs to be reported, where a header of the first data packet includes the first identifier.

Optionally, the first indication information is the second QoS notification. That the transceiver module 1301 is configured to send first indication information to an application network element to which a QoS notification needs to be reported includes: The transceiver module 1301 is configured to send a first message to the application network element to which a QoS notification needs to be reported, where the first message includes the second QoS notification; or the transceiver module 1301 is configured to send a second message to an intermediate network element, where the second message includes the second QoS notification and information about the application network element to which a QoS notification needs to be reported, the intermediate network element sends, based on the information about the application network element to which a QoS notification needs to be reported, a third message to the application network element to which a QoS notification needs to be reported, and the third message includes the second QoS notification.

All related content of the steps in the foregoing method embodiment may be cited in function description of the corresponding functional modules. Details are not described herein again.

In this embodiment, the user plane network element 130 is presented in a form of functional modules obtained through division in an integrated manner. The "module" herein may be a specific ASIC, a circuit, a processor and a memory for executing one or more software or firmware programs, an integrated logic circuit, and/or another component that can provide the foregoing functions. In a simple embodiment, a person skilled in the art may figure out that the user plane network element 130 may be in a form of the communication device 1000 shown in FIG. 10.

For example, the processor 1001 in the communication device 1000 shown in FIG. 10 may invoke the computer-executable instructions stored in the memory 1003, so that the communication device 1000 performs the QoS information notification method in the foregoing method embodiment.

Specifically, functions/implementation processes of the transceiver module 1301 and the processing module 1302 in FIG. 13 may be implemented by the processor 1001 in the communication device 1000 shown in FIG. 10 by invoking the computer-executable instructions stored in the memory 1003. Alternatively, a function/an implementation process of the processing module 1302 in FIG. 13 may be implemented by the processor 1001 in the communication device 1000 shown in FIG. 10 by invoking the computer-executable instructions stored in the memory 1003, and a function/an implementation process of the transceiver module 1301 in FIG. 13 may be implemented by the communication interface 1004 in the communication device 1000 shown in FIG. 10.

The user plane network element 130 provided in this embodiment can perform the foregoing QoS information notification method. Therefore, for technical effects that can be achieved by the user plane network element 130, refer to the foregoing method embodiment. Details are not described herein again.

Figure 14:
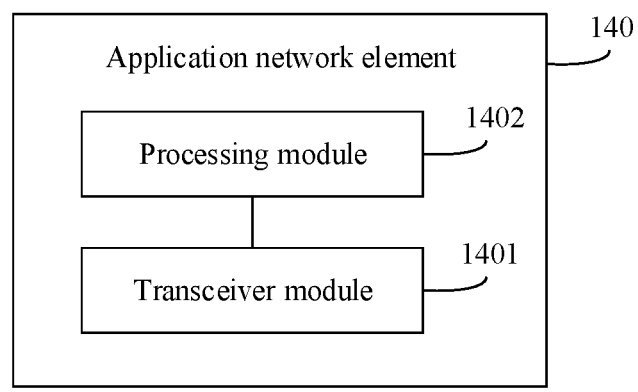
FIG. 14 is a schematic diagram of a structure of an application network element according to an embodiment of this application.

For example, the communication apparatus is the application network element in the foregoing method embodiment. FIG. 14 is a schematic diagram of a structure of an application network element 140. The application network element 140 includes a transceiver module 1401 and a processing module 1402. The transceiver module 1401 may also be referred to as a transceiver unit, and is configured to implement sending and receiving functions. For example, the transceiver module 1401 may be a transceiver circuit, a transceiver machine, a transceiver, or a communication interface.

The transceiver module 1401 is configured to receive first indication information from a user plane network element, where the first indication information is used to indicate a second QoS notification, and the second QoS notification includes second QoS information of a target service. The processing module 1402 is configured to learn of the second QoS information of the target service based on the first indication information.

Optionally, the transceiver module 1401 is further configured to send third indication information to a policy control network element, where the third indication information is used to indicate that the application network element needs a user plane QoS notification, or the third indication information is used to indicate a capability of the application network element to support a user plane QoS notification.

Optionally, the transceiver module 1401 is further configured to send information about the application network element to the policy control network element, where the policy control network element sends the information about the application network element to the user plane network element through a session management network element.

Optionally, the first indication information is a first identifier. That the transceiver module 1401 is configured to receive first indication information from a user plane network element includes: The transceiver module 1401 is configured to receive a first data packet from the user plane network element, where a header of the first data packet includes the first identifier.

Optionally, the first indication information is the second QoS notification. That the transceiver module 1401 is configured to receive first indication information from a user plane network element includes: The transceiver module 1401 is configured to receive a first message from the user plane network element, where the first message includes the second QoS notification; or the transceiver module 1401 is configured to receive a third message from an intermediate network element, where the third message includes the second QoS notification, the third message is triggered after the intermediate network element receives a second message from the user plane network element, and the second message includes the second QoS notification and the information about the application network element.

All related content of the steps in the foregoing method embodiment may be cited in function description of the corresponding functional modules. Details are not described herein again.

In this embodiment, the application network element 140 is presented in a form of functional modules obtained through division in an integrated manner. The "module" herein may be a specific ASIC, a circuit, a processor and a memory for executing one or more software or firmware programs, an integrated logic circuit, and/or another component that can provide the foregoing functions. In a simple embodiment, a person skilled in the art may figure out that the application network element 140 may be in a form of the communication device 1000 shown in FIG. 10.

For example, the processor 1001 in the communication device 1000 shown in FIG. 10 may invoke the computer-executable instructions stored in the memory 1003, so that the communication device 1000 performs the QoS information notification method in the foregoing method embodiment.

Specifically, functions/implementation processes of the transceiver module 1401 and the processing module 1402 in FIG. 14 may be implemented by the processor 1001 in the communication device 1000 shown in FIG. 10 by invoking the computer-executable instructions stored in the memory 1003. Alternatively, a function/an implementation process of the processing module 1402 in FIG. 14 may be implemented by the processor 1001 in the communication device 1000 shown in FIG. 10 by invoking the computer-executable instructions stored in the memory 1003, and a function/an implementation process of the transceiver module 1401 in FIG. 14 may be implemented by the communication interface 1004 in the communication device 1000 shown in FIG. 10.

The application network element 140 provided in this embodiment can perform the foregoing QoS information notification method. Therefore, for technical effects that can be achieved by the application network element 140, refer to the foregoing method embodiment. Details are not described herein again.

It should be noted that one or more of the foregoing modules or units may be implemented by using software, hardware, or a combination thereof. When any one of the foregoing modules or units is implemented by using software, the software exists in a form of computer program instructions and is stored in a memory. A processor may be configured to execute the program instructions and implement the foregoing method procedure. The processor may be built into a SoC (system-on-a-chip) or an ASIC, or may be an independent semiconductor chip. In addition to a core configured to execute software instructions to perform an operation or processing, the processor may further include a necessary hardware accelerator, such as a field programmable gate array (FPGA), a PLD (programmable logic device), or a logic circuit that implements a dedicated logic operation.

When the foregoing modules or units are implemented by using hardware, the hardware may be any one or any combination of a CPU, a microprocessor, a digital signal processing (DSP) chip, a microcontroller unit (MCU), an artificial intelligence processor, an ASIC, a SoC, an FPGA, a PLD, a dedicated digital circuit, a hardware accelerator, or a non-integrated discrete device, and the hardware may run necessary software or does not depend on software to perform the foregoing method procedure.

Optionally, an embodiment of this application further provides a communication apparatus (for example, the communication apparatus may be a chip or a chip system). The communication apparatus includes a processor, configured to implement the method in any one of the foregoing method embodiments. In a possible design, the communication apparatus further includes a memory. The memory is configured to store necessary program instructions and data. The processor may invoke program code stored in the memory, to indicate the communication apparatus to perform the method in any one of the foregoing method embodiments. Certainly, the memory may alternatively not be located in the communication apparatus. When the communication apparatus is a chip system, the chip system may include a chip, or include a chip and another discrete component. This is not specifically limited in this embodiment of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium, or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, wireless, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement other variations of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely example description of this application defined by the appended claims, and are intended to cover any of or all modifications, variations, combinations, or equivalents within the scope of this application. It is clear that a person skilled in the art can make various modifications and variations to this application without departing from the spirit and scope of this application. This application is intended to cover these modifications and variations of this application provided that they fall within the scope of protection defined by the claims of this application and equivalent technologies thereof.

What is claimed is:

1. A quality of service (QOS) information notification method, comprising:
   receiving, by a user plane network element, second indication information from a session management network element, wherein the second indication information indicates that a target service needs a user plane QoS notification;
   obtaining, by the user plane network element, a first QoS notification, wherein the first QoS notification comprises first QoS information indicating QoS of the target service; and
   sending, by the user plane network element based on the second indication information, first indication information to an application network element to which a QoS notification needs to be reported, wherein the first indication information indicates a second QoS notification, the second QoS notification comprises second QoS information of the target service, and the first QoS notification is the same as the second QoS notification, or the second QoS notification is determined based on the first QoS notification.

2. The method according to claim 1, wherein the method further comprises:
   receiving, by the user plane network element from the session management network element, information about the application network element to which a QoS notification needs to be reported.

3. The method according to claim 1, wherein the second QoS information of the target service comprises:
   the QoS of the target service cannot meet a QoS requirement;
   the QoS of the target service has met a QoS requirement;
   a service path of the target service is congested;
   an operation indication related to the target service; or
   QoS monitoring information.

4. The method according to claim 1, wherein the first QoS information indicating the QoS of the target service comprises first QoS information of the target service or first QoS information of a target QoS flow in which the target service is located.

5. The method according to claim 1, further comprising:
   sending, by the session management network element, the second indication information to the user plane network element.

6. The method according to claim 1, further comprising:
   receiving, by the application network element, the first indication information from the user plane network element; and
   identifying, by the application network element, the second QoS information of the target service based on the first indication information.

7. A quality of service (QOS) information notification method, comprising:
   sending, by an application network element, third indication information to a policy control network element, wherein the third indication information indicates that a target service needs a user plane QoS notification;
   receiving, by the application network element, first indication information from a user plane network element, wherein the first indication information indicates a second QoS notification, and the second QoS notification comprises second QoS information of the target service; and
   identifying, by the application network element, the second QoS information of the target service based on the first indication information.

8. The method according to claim 7, wherein the method further comprises:
   sending, by the application network element, information about the application network element to the policy control network element, wherein the policy control network element sends the information about the application network element to the user plane network element through a session management network element.

9. A user plane network element, comprising:
   at least one processor; and
   one or more memories coupled to the at least one processor and storing programming instructions for execution by the at least one processor to perform operations comprising:
      receiving second indication information from a session management network element, wherein the second indication information indicates that a target service needs a user plane quality of service (QOS) notification;
      obtaining a first QoS notification, wherein the first QoS notification comprises first QOS information indicating QoS of the target service; and
      sending, based on the second indication information, first indication information to an application network element to which a QoS notification needs to be reported, wherein the first indication information indicates a second QoS notification, the second QoS notification comprises second QoS information of the target service, and the first QoS notification is the same as the second QoS notification, or the second QoS notification is determined based on the first QoS notification.

10. The user plane network element according to claim 9, wherein the operations further comprise:
    receiving, from the session management network element, information about the application network element to which a QoS notification needs to be reported.

11. The user plane network element according to claim 9, wherein the first QoS information indicating the QoS of the target service comprises first QoS information of the target service or first QoS information of a target QoS flow in which the target service is located.

12. An application network element, comprising:
    at least one processor; and
    one or more memories coupled to the at least one processor and storing programming instructions for execution by the at least one processor to perform operations comprising:
       sending third indication information to a policy control network element, wherein the third indication information indicates that a target service needs a user plane QoS notification;
       receiving first indication information from a user plane network element, wherein the first indication information indicates a second quality of service QoS notification, and the second QoS notification comprises second QoS information of the target service; and identifying the second QoS information of the target service based on the first indication information.

13. The application network element according to claim 12, wherein the operations further comprise:

sending information about the application network element to the policy control network element, wherein the policy control network element sends the information about the application network element to the user plane network element through a session management network element.

14. A communication system, wherein the communication system comprises a session management network element and a user plane network element, wherein:

the session management network element is configured to send second indication information to the user plane network element, wherein the second indication information is used to indicate that a target service needs a user plane quality of service (QOS) notification; and the user plane network element is configured to:

receive the second indication information; and send, based on the second indication information after obtaining a first QoS notification, first indication information to an application network element to which a QoS notification needs to be reported, wherein the first QoS notification comprises first QoS information indicating QoS of the target service, the first indication information indicates a second QoS notification, the second QoS notification comprises second QoS information of the target service, and the first QoS notification is the same as the second QoS notification, or the second QoS notification is determined based on the first QOS notification.

15. The communication system according to claim 14, wherein the communication system further comprises the application network element, and wherein:

the application network element is configured to:

receive the first indication information from the user plane network element; and identify the second QoS information of the target service based on the first indication information.

16. The communication system according to claim 14, wherein the user plane network element is further configured to: receive, from the session management network element, information about the application network element to which a QoS notification needs to be reported.

17. The communication system according to claim 14, wherein the communication system further comprises the application network element and a policy control network element, and wherein:

the application network element is configured to:

send third indication information to the policy control network element, wherein the third indication information indicates that the target service needs a user plane QoS notification; and the policy control network element is configured to:

receive the third indication information; and send fourth indication information to the session management network element, wherein the fourth indication information indicates that the target service needs a user plane QoS notification.

18. The communication system according to claim 17, wherein:

the application network element is further configured to send information about the application network element to the policy control network element;

the policy control network element is further configured to send the information about the application network element to a session management network element; and the session management network element is further configured to send the information about the application network element to the user plane network element.

19. The method according to claim 1, wherein the first QoS information of the target service comprises: QoS monitoring information.

20. The user plane network element according to claim 9, wherein the first QoS information of the target service comprises: QoS monitoring information.

21. The communication system according to claim 14, wherein the first QoS information of the target service comprises: QoS monitoring information.

* * * * *